(12) United States Patent
Chung et al.

(10) Patent No.: US 12,217,747 B2
(45) Date of Patent: Feb. 4, 2025

(54) ELECTRONIC APPARATUS FOR PROCESSING USER UTTERANCE AND CONTROLLING METHOD THEREOF

(71) Applicant: Samsung Electronics Co., Ltd., Suwon-si (KR)

(72) Inventors: Euisuk Chung, Suwon-si (KR); Sangki Kang, Suwon-si (KR); Sunghwan Baek, Suwon-si (KR); Seokyeong Jung, Suwon-si (KR); Kyungtae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 17/271,182

(22) PCT Filed: Aug. 23, 2019

(86) PCT No.: PCT/KR2019/010769
§ 371 (c)(1),
(2) Date: Feb. 24, 2021

(87) PCT Pub. No.: WO2020/040595
PCT Pub. Date: Feb. 27, 2020

(65) Prior Publication Data
US 2021/0335360 A1    Oct. 28, 2021

(30) Foreign Application Priority Data

Aug. 24, 2018 (KR) .......................... 10-2018-0099474

(51) Int. Cl.
*G10L 15/22* (2006.01)
*G10L 15/06* (2013.01)
(Continued)

(52) U.S. Cl.
CPC ............ *G10L 15/22* (2013.01); *G10L 15/063* (2013.01); *G10L 15/10* (2013.01); *G10L 15/142* (2013.01); *G10L 15/16* (2013.01); *G10L 15/30* (2013.01)

(58) Field of Classification Search
CPC ....... G10L 15/22; G10L 15/063; G10L 15/10; G10L 15/142; G10L 15/16; G10L 15/30;
(Continued)

(56) References Cited

U.S. PATENT DOCUMENTS 8,081,230 B2    12/2011  Jiang
9,275,637 B1 *   3/2016  Salvador .................. G10L 15/06
(Continued)

FOREIGN PATENT DOCUMENTS

EP          3121809 A1    1/2017
JP      2005-316247 A   11/2005
(Continued)

OTHER PUBLICATIONS

International Search Report dated Dec. 20, 2019 in connection with International Patent Application No. PCT/KR2019/010769, 2 pages.
(Continued)

*Primary Examiner* — Jesse S Pullias
*Assistant Examiner* — Michael C. Lee

(57) ABSTRACT

Disclosed is an electronic device including a communication interface, a memory, a microphone, a speaker, a display, a main processor, and a sub-processor activating the main processor by recognizing a wake-up word included in a voice input. The at least one memory stores instructions that, when executed, cause the main processor to receive a first voice input to register the wake-up word, when the first voice input does not include a specified word, to receive a second voice input including a word identical to the first voice input, through the microphone, to generate a wake-up
(Continued)

word recognition model for recognizing the wake-up word, and to store the generated wake-up word recognition model in the at least one memory, and when the first voice input includes the specified word, to output information for requesting a third voice input, through the speaker or the display.

12 Claims, 14 Drawing Sheets

(51) Int. Cl.
  *G10L 15/10* (2006.01)
  *G10L 15/14* (2006.01)
  *G10L 15/16* (2006.01)
  *G10L 15/30* (2013.01)
(58) Field of Classification Search
  CPC ... G10L 2015/088; G10L 15/04; G10L 15/02; G10L 15/14; G06F 3/167; G06F 3/16
  See application file for complete search history.

(56) References Cited

U.S. PATENT DOCUMENTS

| | | | |
|---|---|---|---|
| 9,373,321 | B2 | 6/2016 | Bapat et al. |
| 9,530,410 | B1* | 12/2016 | LeBeau .................. G10L 15/22 |
| 9,619,200 | B2 | 4/2017 | Chakladar et al. |
| 9,934,781 | B2 | 4/2018 | Subhojit et al. |
| 10,191,718 | B2 | 1/2019 | Rhee et al. |
| 10,438,593 | B2 | 10/2019 | Alvarez Guevara |
| 10,510,350 | B2 | 12/2019 | Stewart et al. |
| 10,535,354 | B2 | 1/2020 | Alvarez Guevara |
| 10,657,967 | B2 | 5/2020 | Chakladar et al. |
| 10,679,619 | B2 | 6/2020 | Subhojit et al. |
| 2010/0026872 | A1 | 2/2010 | Jiang |
| 2013/0325484 | A1 | 12/2013 | Chakladar et al. |
| 2014/0012586 | A1* | 1/2014 | Rubin .................. G10L 17/24 704/E21.001 |
| 2015/0154953 | A1 | 6/2015 | Bapat et al. |
| 2015/0248885 | A1* | 9/2015 | Koulomzin ............ G10L 15/08 704/251 |
| 2015/0379993 | A1 | 12/2015 | Subhojit et al. |
| 2016/0180838 | A1* | 6/2016 | Parada San Martin ..................... G10L 15/16 704/232 |
| 2017/0025125 | A1* | 1/2017 | Alvarez Guevara ... G10L 15/02 |
| 2017/0092278 | A1* | 3/2017 | Evermann .............. G10L 15/22 |
| 2017/0103754 | A1* | 4/2017 | Higbie ................. H04N 21/812 |
| 2017/0162198 | A1 | 6/2017 | Chakladar et al. |
| 2017/0186433 | A1 | 6/2017 | Alvarez Guevara |
| 2017/0287492 | A1 | 10/2017 | Stewart et al. |
| 2018/0150280 | A1 | 5/2018 | Rhee et al. |
| 2018/0166078 | A1* | 6/2018 | Sharifi .................. G10L 15/063 |
| 2018/0190289 | A1 | 7/2018 | Subhojit et al. |
| 2019/0005954 | A1* | 1/2019 | Xie ......................... G10L 15/30 |
| 2019/0035399 | A1 | 1/2019 | Chakladar et al. |
| 2019/0155571 | A1 | 5/2019 | Rhee et al. |
| 2019/0311715 | A1* | 10/2019 | Pfeffinger ............... G10L 17/22 |
| 2020/0184977 | A1* | 6/2020 | Song ....................... G10L 15/28 |
| 2020/0279563 | A1 | 9/2020 | Chakladar et al. |
| 2020/0302929 | A1 | 9/2020 | Subhojit et al. |

FOREIGN PATENT DOCUMENTS

| | | |
|---|---|---|
| JP | 4537755 B2 | 9/2010 |
| KR | 10-2002-0030156 A | 4/2002 |
| KR | 10-2006-0057377 A | 5/2006 |
| KR | 10-0613520 B1 | 8/2006 |
| KR | 10-2007-0073204 A | 7/2007 |
| KR | 10-2013-0115155 A | 10/2013 |
| KR | 10-2014-0139982 A | 12/2014 |
| KR | 10-2015-0107344 A | 9/2015 |
| KR | 10-2016-0001965 A | 1/2016 |
| KR | 10-2017-0123090 A | 11/2017 |
| KR | 10-2018-0060328 A | 6/2018 |

OTHER PUBLICATIONS

Supplementary European Search Report dated Sep. 14, 2021, in connection with European Application No. 19851849.0, 7 pages.
China National Intellectual Property Administration, "The First Office Action," issued May 6, 2023, in connection with Chinese Patent Application No. 201980055960.9, 18 pages.
Communication pursuant to Article 94(3) EPC dated Sep. 14, 2023, in connection with European Patent Application No. 19851849.0, 5 pages.
Office Action dated Nov. 4, 2023, in connection with Chinese Patent Application No. 201980055960.9, 21 pages.
The Third Office Action dated Mar. 28, 2024, in connection with Chinese Patent Application No. 201980055960.9, 18 pages.
Request for the Submission of an Opinion dated May 22, 2024, in connection with Korean Patent Application No. 10-2018-0099474, 16 pages.
Office Action issued Jun. 24, 2024, in connection with Chinese Patent Application No. 201980055960.9, 12 pages.

* cited by examiner

ELECTRONIC APPARATUS FOR PROCESSING USER UTTERANCE AND CONTROLLING METHOD THEREOF

CROSS-REFERENCE TO RELATED APPLICATIONS

This application is a 371 of International Application No. PCT/KR2019/010769 filed on Aug. 23, 2019, which claims priority to Korean Patent Application No. 10-2018-0099474 filed on Aug. 24, 2018, the disclosures of which are herein incorporated by reference in their entirety.

BACKGROUND

1. Field

Embodiments disclosed in this specification refer to a technology for processing a user utterance.

2. Description of Related Art

Nowadays, electronic devices may support various input schemes such as a voice input and the like in addition to an input scheme using a keyboard or a mouse. For example, electronic devices such as a smartphone and a tablet PC may launch an application associated with a speech recognition service, may receive a user's voice input through the application, may perform an operation corresponding to the voice input or provide the found result corresponding to the voice input.

Nowadays, the speech recognition service is supporting a technology for processing a natural language. The technology for processing a natural language refers to a technology that grasps the intent of a user utterance and provides the user with the result matched with the intent.

A large vocabulary continuous speech recognition (LVCSR) system requires a relatively large amount of computation and a memory capacity, and thus it is difficult to implement the LVCSR system in a user terminal such as a smartphone or a tablet PC. When the LVCSR system is not implemented in the user terminal, it may be difficult for a user terminal to clearly grasp the meaning of words included in a received voice input. Accordingly, it may be difficult for the user terminal to determine whether an inappropriate word (e.g., abuse) is included in the received voice input.

SUMMARY

According to various embodiments of the disclosure, a user terminal may determine whether an inappropriate word is included in a voice input to register a wake-up word, thereby preventing the inappropriate word from being registered as a wake-up word (or a start utterance to start a speech recognition service).

According to various embodiments disclosed in this specification, an electronic device may include a communication interface, at least one memory, a microphone, a speaker, a display, a main processor, and a sub-processor activating the main processor by recognizing a wake-up word included in a voice input. The at least one memory may store instructions that, when executed, cause the main processor to receive a first voice input to register the wake-up word through the microphone, to determine whether the first voice input includes a specified word, when the first voice input does not include a specified word, to receive a second voice input including a word identical to the first voice input, through the microphone, to generate a wake-up word recognition model for recognizing the wake-up word based on the first voice input and the second voice input, and to store the generated wake-up word recognition model in the at least one memory, and when the first voice input includes the specified word, to output information for requesting a third voice input different from the first voice input, through the speaker or the display.

Furthermore, according to various embodiments disclosed in this specification, a method for processing a voice input may include receiving a first voice input to register a wake-up word, determining whether the first voice input includes a specified word, when the first voice input does not include the specified word, receiving a second voice input including a word identical to the first voice input, generating a wake-up word recognition model for recognizing the wake-up word based on the first voice input and the second voice input, and storing the generated wake-up word recognition model in at least one memory, and when the first voice input includes the specified word, outputting information for requesting a third voice input different from the first voice input, through a speaker or a display.

According to various embodiments disclosed in this specification, when receiving a voice input to register a wake-up word for activating a main processor, a user terminal may determine whether the received voice input includes an inappropriate word, thereby preventing the inappropriate word from being registered as the wake-up word.

Besides, a variety of effects directly or indirectly understood through the specification may be provided.

With regard to description of drawings, the same or similar components will be marked by the same or similar reference signs.

DETAILED DESCRIPTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
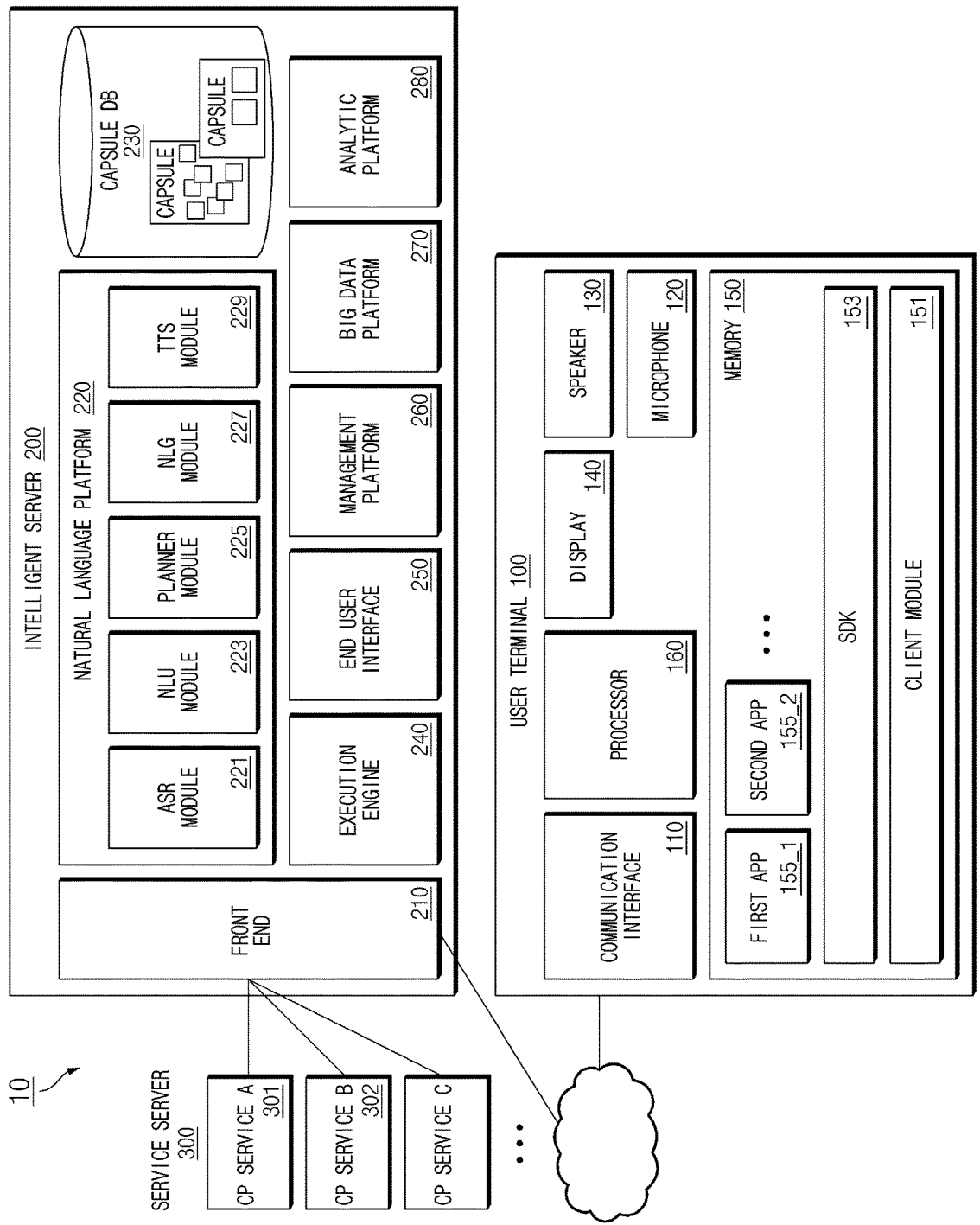
FIG. 1 is a block diagram illustrating an integrated intelligence system, according to an embodiment.

FIG. 1 is a block diagram illustrating an integrated intelligence system, according to an embodiment.

Referring to FIG. 1, an integrated intelligence system 10 according to an embodiment may include a user terminal 100, an intelligence server 200, and a service server 300.

The user terminal 100 according to an embodiment may be a terminal device (or an electronic device) capable of connecting to Internet, and may be, for example, a mobile phone, a smartphone, a personal digital assistant (PDA), a notebook computer, TV, a white household appliance, a wearable device, a HMD, or a smart speaker.

According to the illustrated embodiment, the user terminal 100 may include a communication interface 110, a microphone 120, a speaker 130, a display 140, a memory 150, or a processor 160. The listed components may be operatively or electrically connected to one another.

The communication interface 110 according to an embodiment may be connected to an external device and may be configured to transmit or receive data to or from the external device. The microphone 120 according to an embodiment may receive a sound (e.g., a user utterance) to convert the sound into an electrical signal. The speaker 130 according to an embodiment may output the electrical signal as a sound (e.g., voice). The display 140 according to an embodiment may be configured to display an image or a video. The display 140 according to an embodiment may display the graphic user interface (GUI) of the running app (or an application program).

The memory 150 according to an embodiment may store a client module 151, a software development kit (SDK) 153, and a plurality of apps 155. The client module 151 and the SDK 153 may constitute a framework (or a solution program) for performing general-purposed functions. Furthermore, the client module 151 or the SDK 153 may constitute the framework for processing a voice input.

In the memory 150 according to an embodiment, the plurality of apps 155 may be programs for performing the specified function. According to an embodiment, the plurality of apps 155 may include a first app 155_1 and a second app 155_2. According to an embodiment, each of the plurality of apps 155 may include a plurality of actions for performing a specified function. For example, the apps may include an alarm app, a message app, and/or a schedule app. According to an embodiment, the plurality of apps 155 may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, and the display 140 to perform a specified operation.

Moreover, the processor 160 according to an embodiment may execute the program stored in the memory 150 to perform a specified function. For example, according to an embodiment, the processor 160 may execute at least one of the client module 151 or the SDK 153 to perform a following operation for processing a voice input. The processor 160 may control operations of the plurality of apps 155 via the SDK 153. The following operation described as an operation of the client module 151 or the SDK 153 may be executed by the processor 160.

According to an embodiment, the client module 151 may receive a voice input. For example, the client module 151 may receive a voice signal corresponding to a user utterance detected through the microphone 120. The client module 151 may transmit the received voice input to the intelligence server 200. The client module 151 may transmit state information of the user terminal 100 to the intelligence server 200 together with the received voice input. For example, the state information may be execution state information of an app.

According to an embodiment, the client module 151 may receive a result corresponding to the received voice input. For example, when the intelligence server 200 is capable of calculating the result corresponding to the received voice input, the client module 151 may receive the result corresponding to the received voice input. The client module 151 may display the received result on the display 140.

According to an embodiment, the client module 151 may receive a plan corresponding to the received voice input. The client module 151 may display, on the display 140, a result of executing a plurality of actions of an app depending on the plan. For example, the client module 151 may sequentially display the result of executing the plurality of actions on a display. For another example, the user terminal 100 may display only a part of results (e.g., a result of the last action) of executing the plurality of actions, on the display.

According to an embodiment, the client module 151 may receive a request for obtaining information necessary to calculate the result corresponding to a voice input, from the intelligence server 200. According to an embodiment, the client module 151 may transmit the necessary information to the intelligence server 200 in response to the request.

According to an embodiment, the client module 151 may transmit, to the intelligence server 200, information about the result of executing a plurality of actions depending on the plan. The intelligence server 200 may identify that the received voice input is correctly processed, using the result information.

According to an embodiment, the client module 151 may include a speech recognition module. According to an embodiment, the client module 151 may recognize a voice input to perform a limited function, via the speech recognition module. For example, the client module 151 may launch an intelligence app that processes a voice input to perform organic operations, via a specified input (e.g., wake up!).

According to an embodiment, the intelligence server 200 may receive information associated with a user's voice input from the user terminal 100 over a communication network. According to an embodiment, the intelligence server 200 may convert data associated with the received voice input to text data. According to an embodiment, the intelligence server 200 may generate a plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligence server 200 may transmit a result according to the generated plan to the user terminal 100 or may transmit the generated plan to the user terminal 100. According to an embodiment, the user terminal 100 may display the result according to the plan, on a display. According to an embodiment, the user terminal 100 may display a result of executing the action according to the plan, on the display.

The intelligence server 200 according to an embodiment may include a front end 210, a natural language platform 220, a capsule database (DB) 230, an execution engine 240, an end user interface 250, a management platform 260, a big data platform 270, or an analytic platform 280.

According to an embodiment, the front end 210 may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech module (TTS) module 229.

According to an embodiment, the ASR module 221 may convert the voice input received from the user terminal 100 into text data. According to an embodiment, the NLU module 223 may grasp the user's intent, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 225 may generate the plan by using the intent and a parameter, which are determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or a result value output by the execution of the plurality of actions. The parameter and the result value may be defined as a concept of a specified form (or class). As such, the plan may include the plurality of actions and a plurality of concepts, which are determined by the intent of the user. The planner module 225 may determine a relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters necessary to perform the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan, using information stored in the capsule DB 230 storing a set of relationships between concepts and actions.

According to an embodiment, the NLG module 227 may change specified information into information in a text form. The information changed to the text form may be in the form of a natural language speech. The TTS module 229 according to an embodiment may change information in the text form to information in a voice form.

The capsule DB 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 230 may store the plurality of capsules in a form of a concept action network (CAN). According to an embodiment, the plurality of capsules may be stored in the function registry included in the capsule DB 230.

The capsule DB 230 may include a strategy registry that stores strategy information necessary to determine a plan corresponding to a voice input. When there are a plurality of plans corresponding to the voice input, the strategy information may include reference information for determining one plan. According to an embodiment, the capsule DB 230 may include a follow-up registry that stores information of the follow-up action for suggesting a follow-up action to the user in a specified context. For example, the follow-up action may include a follow-up utterance. According to an embodiment, the capsule DB 230 may include a layout registry storing layout information of information output via the user terminal 100. According to an embodiment, the capsule DB 230 may include a vocabulary registry storing vocabulary information included in capsule information. According to an embodiment, the capsule DB 230 may include a dialog registry storing information about dialog (or interaction) with the user. The capsule DB 230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on the currently-set target, the user's preference, or an environment condition. The capsule DB 230 according to an embodiment may be also implemented in the user terminal 100.

According to an embodiment, the execution engine 240 may calculate a result by using the generated plan. The end user interface 250 may transmit the calculated result to the user terminal 100. Accordingly, the user terminal 100 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage quality of service (QoS) of the intelligence server 200. For example, the analytic platform 280 may manage the component and processing speed (or efficiency) of the intelligence server 200.

According to an embodiment, the service server 300 may provide the user terminal 100 with a specified service (e.g., food order or hotel reservation). According to an embodiment, the service server 300 may be a server operated by the third party. According to an embodiment, the service server 300 may provide the intelligence server 200 with information for generating a plan corresponding to the received voice input. The provided information may be stored in the capsule DB 230. Furthermore, the service server 300 may provide the intelligence server 200 with result information according to the plan.

In the above-described integrated intelligence system 10, the user terminal 100 may provide the user with various intelligent services in response to a user input. The user input may include, for example, an input through a physical button, a touch input, or a voice input.

According to an embodiment, the user terminal 100 may provide a speech recognition service via an intelligence app (or a speech recognition app) stored therein. In this case, for example, the user terminal 100 may recognize a user utterance or a voice input, which is received via the microphone, and may provide the user with a service corresponding to the recognized voice input.

According to an embodiment, the user terminal 100 may perform a specified action, based on the received voice input, independently, or together with the intelligence server and/or the service server. For example, the user terminal 100 may launch an app corresponding to the received voice input and may perform the specified action via the executed app.

According to an embodiment, when the user terminal 100 provides a service together with the intelligence server 200 and/or the service server, the user terminal 100 may detect a user utterance by using the microphone 120 and may generate a signal (or voice data) corresponding to the detected user utterance. The user terminal may transmit the voice data to the intelligence server 200, using the communication interface 110.

According to an embodiment, the intelligence server 200 may generate a plan for performing a task corresponding to the voice input or the result of performing an action depending on the plan, as a response to the voice input received from the user terminal 100. For example, the plan may include a plurality of actions for performing a task corresponding to the voice input of the user and a plurality of concepts associated with the plurality of actions. The concept may define a parameter to be input upon executing the plurality of actions or a result value output by the execution of the plurality of actions. The plan may include relationship information between the plurality of actions and the plurality of concepts.

According to an embodiment, the user terminal 100 may receive the response, using the communication interface 110. The user terminal 100 may output the voice signal generated in the user terminal 100 to the outside by using the speaker 130 or may output an image generated in the user terminal 100 to the outside by using the display 140.

Figure 2:
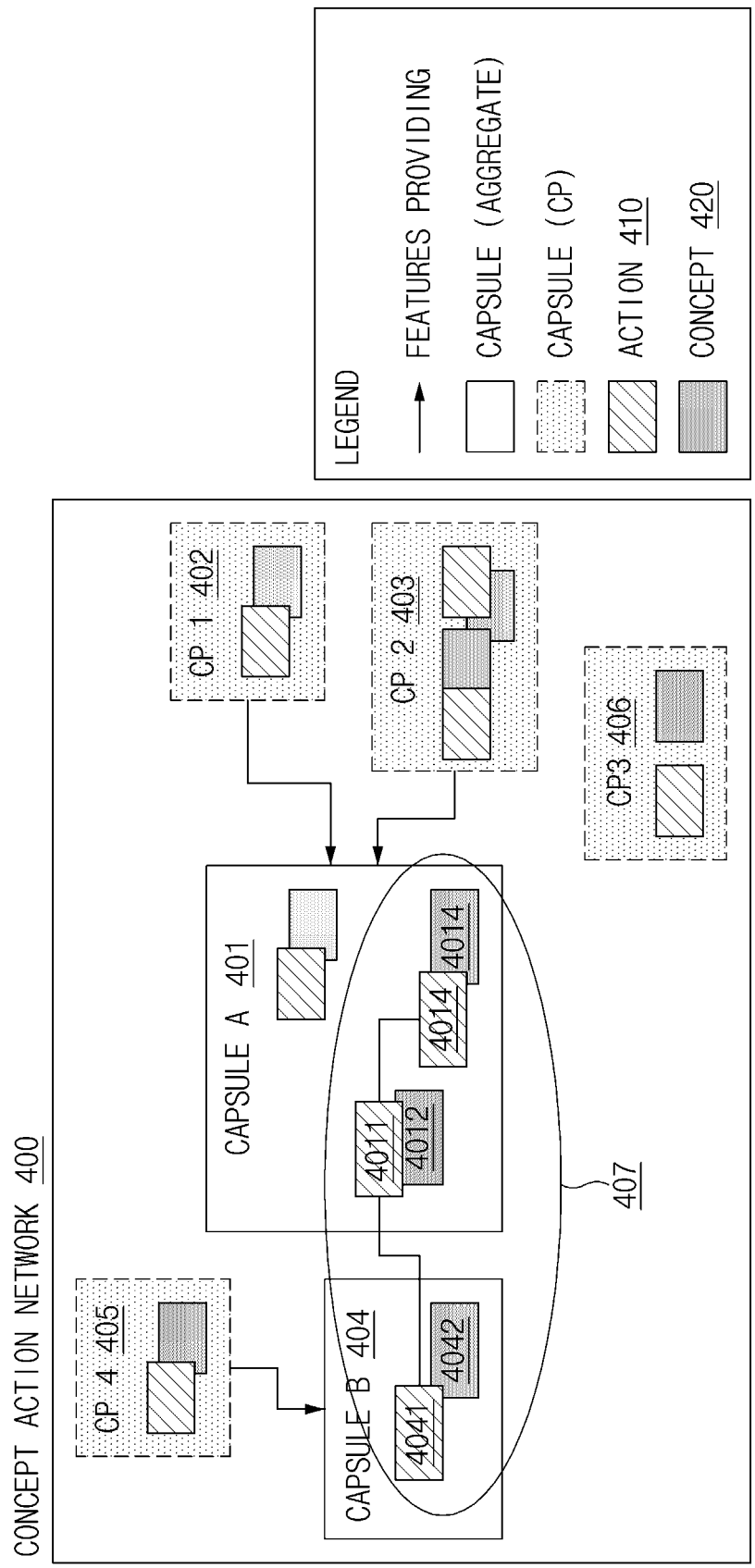
FIG. 2 is a diagram illustrating the form in which relationship information between a concept and an action is stored in a database, according to an embodiment.

FIG. 2 is a diagram illustrating a form in which relationship information between a concept and an action is stored in a database, according to various embodiments.

A capsule database (e.g., the capsule DB 230) of the intelligence server 200 may store a capsule in the form of a concept action network (CAN). The capsule DB may store an action for processing a task corresponding to a user's voice input and a parameter necessary for the action, in the CAN form.

The capsule DB may store a plurality capsules capsule A 401 and capsule B 404 respectively corresponding to a plurality of domains (e.g., applications). According to an embodiment, one capsule (e.g., the capsule A 401) may correspond to one domain (e.g., a location (geo) or an application). Furthermore, at least one service provider (e.g., CP 1 402 or CP 2 403) for performing a function for a domain associated with the capsule may correspond to one capsule. According to an embodiment, the single capsule may include at least one or more actions 410 and at least one or more concepts 420 for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, the planner module 225 may generate a plan 407, using actions 4011 and 4013 and concepts 4012 and 4014 of the capsule A 410 and an action 4041 and a concept 4042 of the capsule B 404.

Figure 3:
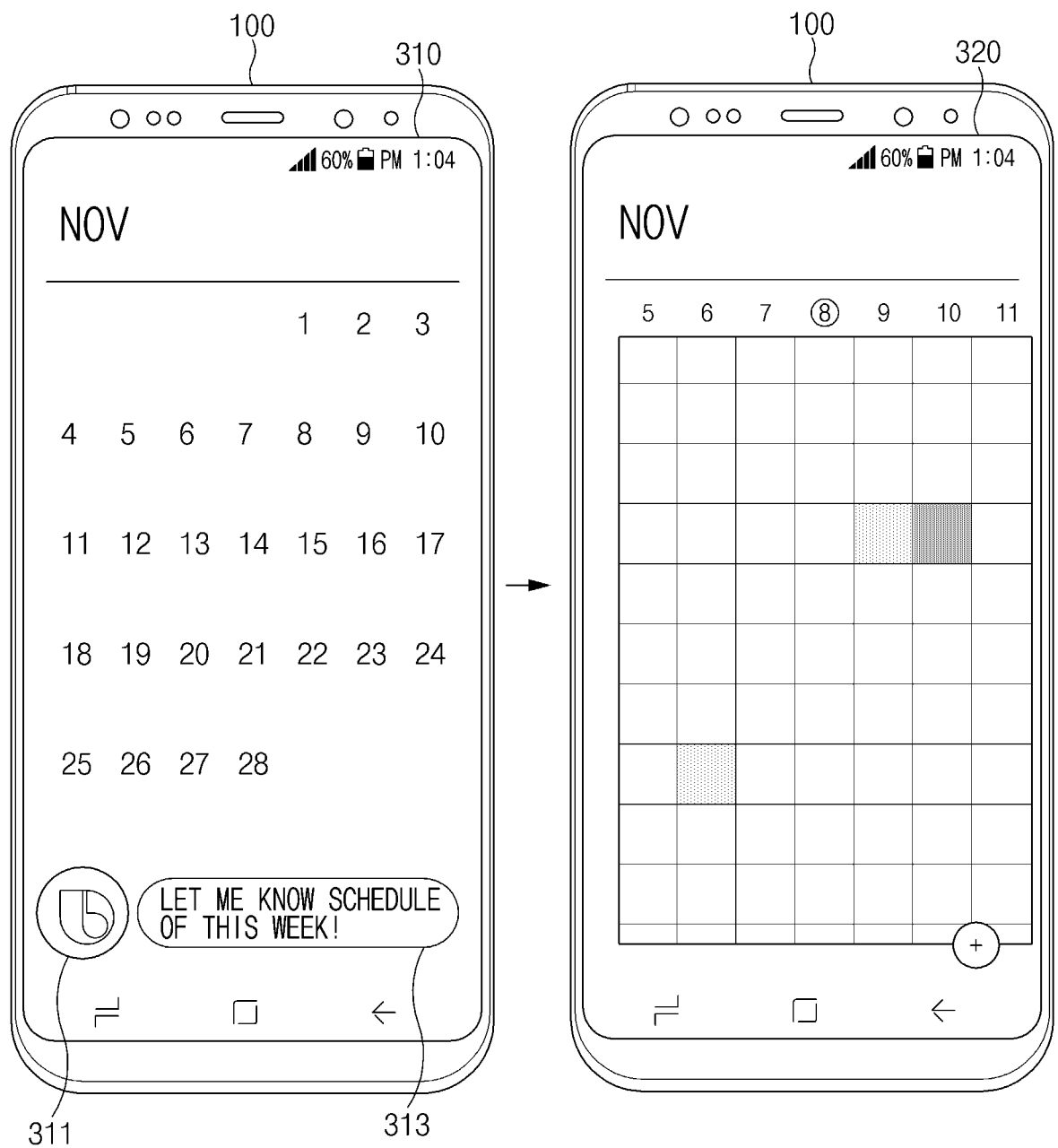
FIG. 3 is a view illustrating a user terminal displaying a screen of processing a voice input received through an intelligence app, according to an embodiment.

FIG. 3 is a view illustrating a screen in which a user terminal processes a voice input received through an intelligence app, according to various embodiments.

The user terminal 100 may execute an intelligence app to process a user input through the intelligence server 200.

According to an embodiment, on screen 310, when recognizing a specified voice input (e.g., wake up!) or receiving an input via a hardware key (e.g., a dedicated hardware key), the user terminal 100 may launch an intelligence app for processing a voice input. For example, the user terminal 100 may launch the intelligence app in a state where a schedule app is executed. According to an embodiment, the user terminal 100 may display an object (e.g., an icon) 311 corresponding to the intelligence app, on the display 140. According to an embodiment, the user terminal 100 may receive a voice input by a user utterance. For example, the user terminal 100 may receive a voice input saying that "let me know the schedule of this week!". According to an embodiment, the user terminal 100 may display a user interface (UI) 313 (e.g., an input window) of the intelligence app, in which text data of the received voice input is displayed, on a display.

According to an embodiment, on screen 320, the user terminal 100 may display a result corresponding to the received voice input, on the display. For example, the user terminal 100 may receive a plan corresponding to the received user input and may display 'the schedule of this week' on the display depending on the plan.

Figure 4:
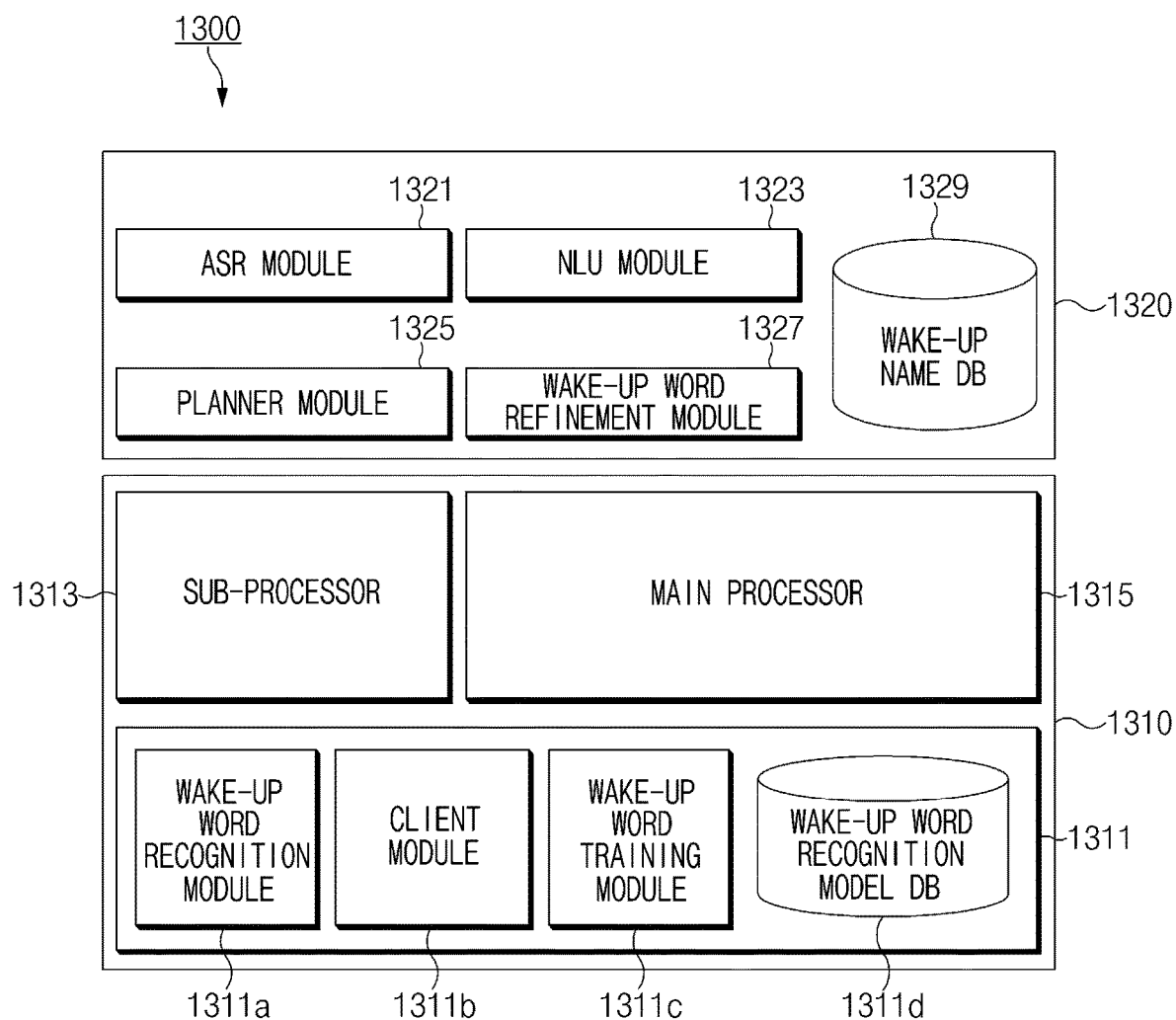
FIG. 4 is a block diagram illustrating a configuration of an intelligence system according to various embodiments.

FIG. 4 is a block diagram illustrating a configuration of an intelligence system according to various embodiments.

Referring to FIG. 4, an intelligence system 1300 may include a user terminal 1310 and an intelligence server 1320. The user terminal 1310 and the intelligence server 1320 may be similar to the user terminal 100 and the intelligence server 200 of FIG. 1.

According to an embodiment, the user terminal 1310 may include a memory 1311 (e.g., the memory 150 of FIG. 1), a sub-processor 1313 (e.g., the processor 160 of FIG. 1), and a main processor 1315 (e.g., the processor 160 of FIG. 1). According to an embodiment, a configuration of the user terminal 1310 is not limited thereto, and may further include the configuration of the user terminal 100 of FIG. 1.

According to an embodiment, the memory 1311 may store a wake-up word recognition module 1311a, a client module 1311b, a wake-up word training module 1311c, and a wake-up word recognition model database (DB) 1311d. The wake-up word recognition module 1311a, the client module 1311b, and the wake-up word training module 1311c may be frameworks for performing general-purpose functions. According to an embodiment, the wake-up word recognition module 1311a, the client module 1311b, and the wake-up word training module 1311c may be executed by a processor (e.g., the sub-processor 1313 and the main processor 1315) to implement the functions thereof. According to an embodiment, the wake-up word recognition module 1311a, the client module 1311b, and the wake-up word training module 1311c may also be implemented with not only software but also hardware.

According to an embodiment, a wake-up word recognized by the wake-up word recognition module 1311a may be a wake-up utterance that calls a speech recognition service. For example, the wake-up word may be an input to change the main processor 1315 to be in a state capable of processing a voice input.

According to an embodiment, the memory 1311 may include a separate memory for storing the wake-up word recognition model DB 1311d. The memory 1311 may include a first memory storing an instruction for controlling an operation of a processor (e.g., the sub-processor 1313 and the main processor 1315), and a second memory storing the wake-up word recognition model DB 1311. For example, the first memory may store the wake-up word recognition module 1311a, the client module 1311b, and the wake-up word training module 1311c. The second memory may be physically separate from the first memory. According to an embodiment, before the electronic device 1300 is activated, the second memory may be accessible by the sub-processor 1313. For example, the sub-processor 1313 may read information (e.g., wake-up word recognition model information) stored in the second memory to recognize a voice input to activate the electronic device 1300. For another example, the memory 1311 may include one memory that stores the wake-up word recognition module 1311a, the client module 1311b, the wake-up word training module 1311c, and the wake-up word recognition model DB 1311d. In other words, the memory 1311 may not separately include a memory for the wake-up word recognition model DB 1311.

According to an embodiment, the sub-processor 1313 may control a limited operation of the user terminal 1310. For example, the sub-processor 160 may activate the main processor 1315 by recognizing a specified word (or a wake-up word). In other words, a state of the user terminal 1310 may be changed from a first state (e.g., an inactive state, a standby state, or a sleep state) where only the limited operation (e.g., maintaining a system boot state) is performed by the sub-processor 1313, to a second state (e.g., an active state) where an operation of providing a plurality of services (e.g., a message transmission/reception function and a phone call function) is performed. According to an embodiment, the sub-processor 1313 may be a processor that consumes power less than the main processor 1315.

According to an embodiment, the sub-processor 1313 may perform the wake-up word recognition module 1311a to perform an operation of recognizing a wake-up word. The following operation described as an operation of the wake-up word recognition module 1311a may be executed by the sub-processor 1313.

According to an embodiment, the wake-up word recognition module 1311a may recognize the limited number of words. For example, the wake-up word recognition module 1311a may recognize a wake-up word for activating the main processor 1315. According to an embodiment, the wake-up word recognition module 1311a may use a wake-up word recognition model. The wake-up word recognition model may include information necessary to recognize a wake-up word. For example, when a speech recognition function is performed based on a hidden Markov model (HMM) algorithm, the wake-up word recognition model may include a state initial probability, a state transition probability, an observation probability, or the like. For another example, when the speech recognition function is performed based on a neural network algorithm, the wake-up word recognition module may include neural network model information such as a layers, a type and structure of a node, a weight for each node, network connection information, and a nonlinear activation function. According to an embodiment, when recognizing the wake-up word through the wake-up word recognition module 1311a, the sub-processor 1313 may activate the main processor 1315.

According to an embodiment, the wake-up word recognition module 1311a may determine whether a plurality of voice inputs are the same as one another, by measuring a similarity between a plurality of voice inputs. For example, the wake-up word recognition module 1311a may extract feature vectors of a plurality of voice inputs and may measure a similarity between the extracted feature vectors by using dynamic time warping (DTW). For another example, when the speech recognition function is performed based on the HMM algorithm, the wake-up word recognition module 1311a may measure the similarity between the plurality of voice inputs by using a forward-backward probability. For another example, when the wake-up word recognition module 1311a is performed based on a neural network algorithm, the wake-up word recognition module 1311a may measure the similarity between the plurality of voice inputs by using a phoneme level measured through a phoneme recognizer. According to an embodiment, when the measured similarity is not less than a specified value, the wake-up word recognition module 1311a may determine that the plurality of voice inputs are the same as one another. According to an embodiment, the wake-up word recognition module 1311a may determine whether a plurality of voice inputs for training a wake-up word include the same word. According to an embodiment, an operation of the wake-up word recognition module 1311a for training the wake-up word may be executed by the main processor 1315.

According to an embodiment, the main processor 1315 may execute the client module 1311b to perform an operation of processing a voice input. The voice input may be a user input to command for performing a specified task. The following operation described as an operation of the client module 1311b may be executed by the main processor 1315.

According to an embodiment, the client module 1311b may transmit a voice input to perform a specified task to the intelligence server 1320. According to an embodiment, the client module 1311b may receive a plan corresponding to the voice input through the intelligence server 1320. The plan may include action information for performing the specified task. According to an embodiment, the client module 1311b may execute an operation of an app depending on the received plan to perform the specified task, and thus may provide a user with the result of performing the specified task.

According to an embodiment, when receiving a voice input to register a wake-up word, the client module 1311*b* may transmit a voice input to the intelligence server 1320. For example, the client module 1311*b* may transmit the voice input to the intelligence server 1320 through a communication interface (e.g., the communication interface 110 of FIG. 1). According to an embodiment, the client module 1311*b* may receive a result of determining whether a voice input includes a specified word, from the intelligence server 1320. For example, the client module 1311*b* may receive the determination result through a communication interface. According to an embodiment, the client module 1311*b* may determine whether a wake-up word is capable of being registered, based on the determination result. Accordingly, when the received voice input is capable of being registered as a wake-up word, the client module 1311*b* may register the wake-up word based on the received voice input through the wake-up word training module 1311*c*.

According to an embodiment, the main processor 1315 may execute the wake-up word training module 1311*c* to perform an operation of registering (or generating) a wake-up word. A user may register a word desired by the user as a wake-up word for activating the main processor 1315. The following operation described as an operation of the wake-up word training module 1311*c* may be executed by the main processor 1315.

According to an embodiment, the wake-up word training module 1311*c* may perform wake-up word recognition training for registering a wake-up word. The wake-up word training module 1311*c* may perform the wake-up word recognition training, based on a voice input that is repeatedly received. For example, when the speech recognition function is performed based on the HMM algorithm, the wake-up word training module 1311*c* may generate a wake-up word recognition model by performing model training using an expectation maximization (EM) algorithm or by performing adaptive training using maximum likelihood linear regression (MLLR) and maximum a posteriori estimation (MAP). For another example, when the speech recognition function is performed based on a neural network algorithm, the wake-up word training module 1311*c* may perform model training using a feedforward or backward-propagation algorithm or may perform adaptive training using linear transformation. According to an embodiment, the wake-up word training module 1311*c* may determine whether the same wake-up word is included in the voice input repeatedly received through the wake-up word recognition module 1311*a*. Accordingly, the wake-up word training module 1311*c* may perform wake-up word recognition training based on a voice input including the same wake-up word. According to an embodiment, the wake-up word training module 1311*c* may generate a wake-up word recognition model through the wake-up word recognition training.

According to an embodiment, the wake-up word recognition model DB 1311*d* may store the generated wake-up word recognition model. According to an embodiment, the wake-up word recognition module 1311*a* may recognize a wake-up word by using wake-up word recognition model information stored in the wake-up word recognition model DB 1311*d*.

According to an embodiment, the intelligence server 1320 may include an ASR module 1321 (e.g., the ASR module 221 of FIG. 1), an NLU module 1323 (e.g., the NLU module 223 of FIG. 1), a planner module 1325 (e.g., the planner module 225 of FIG. 1), a wake-up word refinement module 1327, and a wake-up word DB 1329. According to an embodiment, the configuration of the intelligence server 1320 is not limited thereto, and the configuration of the intelligence server 200 of FIG. 1 may be further included.

According to an embodiment, the ASR module 1321 may change the voice input to text data. According to an embodiment, the ASR module 1321 may be implemented by using an HMM algorithm, a weighted finite-state transducer (wFST) algorithm, a neural network algorithm, or the like. For example, the ASR module 1321 may change the voice input into the text data by comparing a specified word with the voice input by using a distance measuring method. For example, the distance measuring method may include a measuring method such as Levenshtein distance, Jaro-Winkler distance, or the like. For another example, the distance measuring method may include a method of converting texts into a pronunciation string through a grapheme-to-phoneme (G2P) and then measuring a distance between the texts at a phoneme level.

According to an embodiment, the ASR module 1321 may include an LVCSR system. Accordingly, the ASR module 1321 may use a more complex calculation process than the wake-up word recognition module 1311*a* of the user terminal 1310 and may recognize many words.

According to an embodiment, the NLU module 1323 may determine a parameter and an intent corresponding to the voice input by using the text data delivered from the ASR module 1321.

According to an embodiment, the planner module 1325 may generate a plan corresponding to the voice input based on the parameter and the intent determined by the NLU module 1323. The plan may include action information for performing a task corresponding to the voice input. Accordingly to an embodiment, the planner module 1325 may arrange an action for performing the task step by step, and may determine a concept defining a parameter input to execute the arranged action or a result value output by execution. Accordingly, the planner module 1325 may generate a plan.

According to an embodiment, the wake-up word refinement module 1327 may determine whether a wake-up word is capable of being registered, based on the received voice input under a specified condition. For example, the wake-up word refinement module 1327 may determine whether a wake-up word is capable of being registered, based on the received voice input by determining whether the voice input includes a specified word. The wake-up word refinement module 1327 may obtain text data of the voice input received through the ASR module 1321 and may determine whether the specified word is included in the text data. For example, the specified word may be inappropriate to be set as a wake-up word and may include a word (e.g., a product name of a competitor) degrading a manufacturer, abuse, or the like. According to an embodiment, when the voice input includes the specified word, the wake-up word refinement module 1327 may determine that the wake-up word is incapable of being registered, based on the received voice input. Furthermore, when the voice input does not include the specified word, the wake-up word refinement module 1327 may determine that the wake-up word is capable of being registered, using the received voice input. According to an embodiment, the wake-up word refinement module 1327 may transmit the determination result to the user terminal 1310.

According to an embodiment, the wake-up word refinement module 1327 may generate a wake-up name of the user terminal 1310 by refining the registered wake-up word.

According to an embodiment, the intelligence server 1320 may generate a response corresponding to the voice input by using the wake-up name. In other words, the intelligence server 1320 may provide the response including the wake-up name to the user terminal 1310. For example, the wake-up name may be used as the name of a voice assistant. According to an embodiment, the wake-up word refinement module 1327 may store the determined wake-up name in the wake-up name DB 1329.

According to an embodiment, the intelligence server 1320 may generate guide information for receiving a specified voice input from the user. For example, the intelligence server 1320 may generate the guide information for receiving a voice input for wake-up word training. When receiving the voice input including an inappropriate word, the intelligence server 3120 may generate the guide information for receiving a voice input different from the inappropriate word. According to an embodiment, the intelligence server 1320 may transmit the generated guide information to the user terminal 1310. The user terminal 1310 may output the guide information.

The user terminal 1310 may prevent the inappropriate word from being registered as a wake-up word, by determining whether the inappropriate word is included in a voice input for registering the wake-up word.

Figure 5:
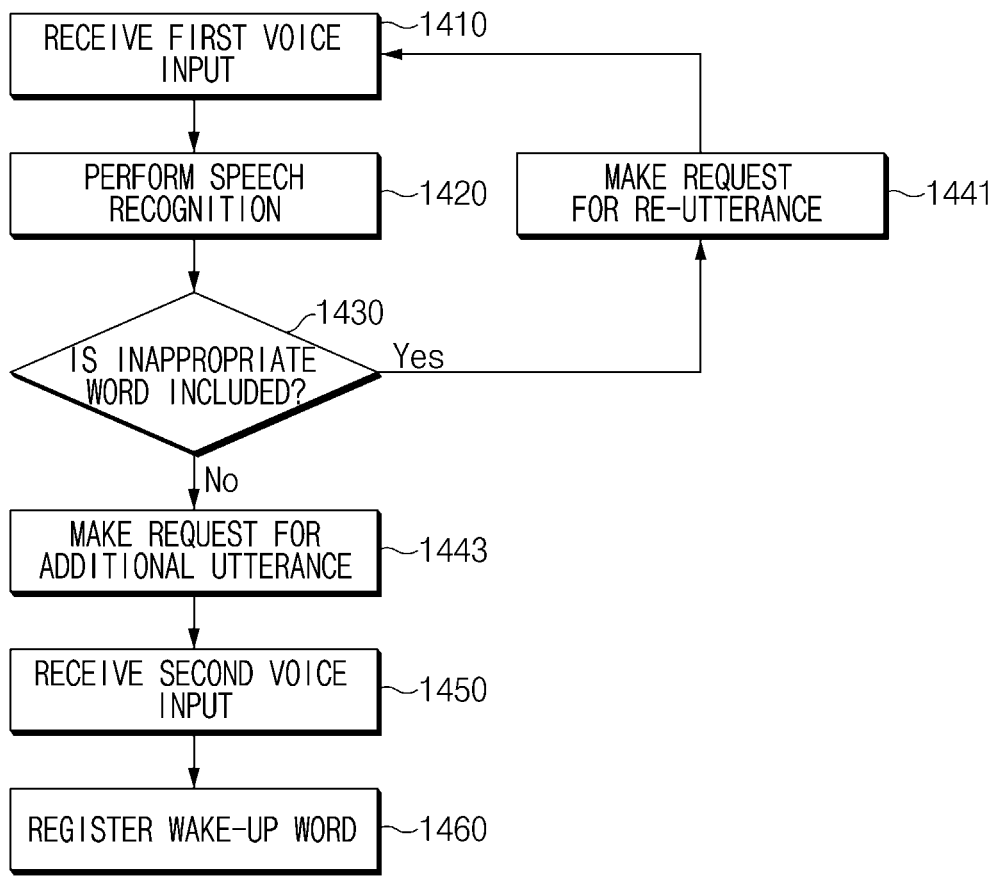
FIG. 5 is a flowchart illustrating a method, in which a user terminal registers a wake-up word, according to an embodiment.

FIG. 5 is a flowchart 1400 illustrating a method, in which a user terminal registers a wake-up word, according to an embodiment.

Referring to FIG. 5, a user terminal (e.g., the user terminal 1310 of FIG. 4) may determine whether an inappropriate word is included in a voice input, through an intelligence server (e.g., the intelligence server 1320 of FIG. 4) and may register a wake-up word.

According to an embodiment, in operation 1410, the user terminal may receive a first voice input to register a wake-up word. For example, the user terminal may receive "Galaxy". According to an embodiment, the user terminal may transmit the received first voice input to the intelligence server.

According to an embodiment, in operation 1420, the intelligence server may recognize the received first voice input. For example, the intelligence server may convert the first voice input to text data (e.g., Galaxy) through an ASR module (e.g., the ASR module 1321 of FIG. 4).

According to an embodiment, in operation 1430, the intelligence server may determine whether the recognized first voice input includes a specified word. For example, the specified word may be an inappropriate word (or a word that is prohibited to be registered as a wake-up word). According to an embodiment, the intelligence server may transmit the determination result to the user terminal. According to an embodiment, the user terminal may perform the following operation of registering a wake-up word based on the determination result.

According to an embodiment, when the first voice input includes a specified word (Yes), in operation 1441, the user terminal may make a request for a re-utterance for receiving a voice input different from the specified word. The user terminal may output a re-utterance request (e.g., "please try another wake-up word!") through a speaker (e.g., the speaker 130 of FIG. 1) or a display (e.g., the display 140 of FIG. 1).

According to an embodiment, when the first voice input does not include the specified word (No), in operation 1443, the user terminal may make a request for an additional utterance for wake-up word recognition training. For example, the user terminal may output first guide information (e.g., "please say 'Galaxy' again") for receiving the same second voice input as the first voice input (e.g., Galaxy) through a speaker or a display. For example, the first guide information may be generated by using the first voice input. According to an embodiment, the user terminal may receive the first guide information from the intelligence server. The intelligence server may generate the first guide information by using the first voice input received from the user terminal.

According to an embodiment, in operation 1450, the user terminal may receive a second voice input including the same information as the first voice input. For example, the user terminal may receive "Galaxy" again.

According to an embodiment, in operation 1460, the user terminal may register a wake-up word based on the first voice input and the second voice input. For example, the user terminal may generate a wake-up word recognition model for recognizing the wake-up word based on the first voice input and the second voice input and may store the generated wake-up word recognition model in the memory. For example, the wake-up word recognition module may be generated by using a model training or adaptive training algorithm based on at least one of a HIVIM algorithm or a neural network algorithm.

According to an embodiment, the user terminal may receive a third voice input corresponding to a re-utterance request in operation 1441 and may receive a fourth voice input for wake-up word training. The user terminal may perform operation 1420 and operation 1430 to process the third voice input and may perform operation 1443, operation 1450, and operation 1460 to process the fourth voice input. Accordingly, the user terminal may register a wake-up word. For example, the user terminal may receive the third voice input and may determine whether the third voice input includes the specified word, through the intelligence server. When the third voice input does not include the specified word, the user terminal may receive the fourth voice input including the same word as the third voice input and may register the wake-up word based on the third voice input and the fourth voice input.

Accordingly, when receiving a voice input including the registered wake-up word in a standby state, the user terminal may recognize the wake-up word, and then the state of the user terminal may be changed to an active state.

Figure 6:
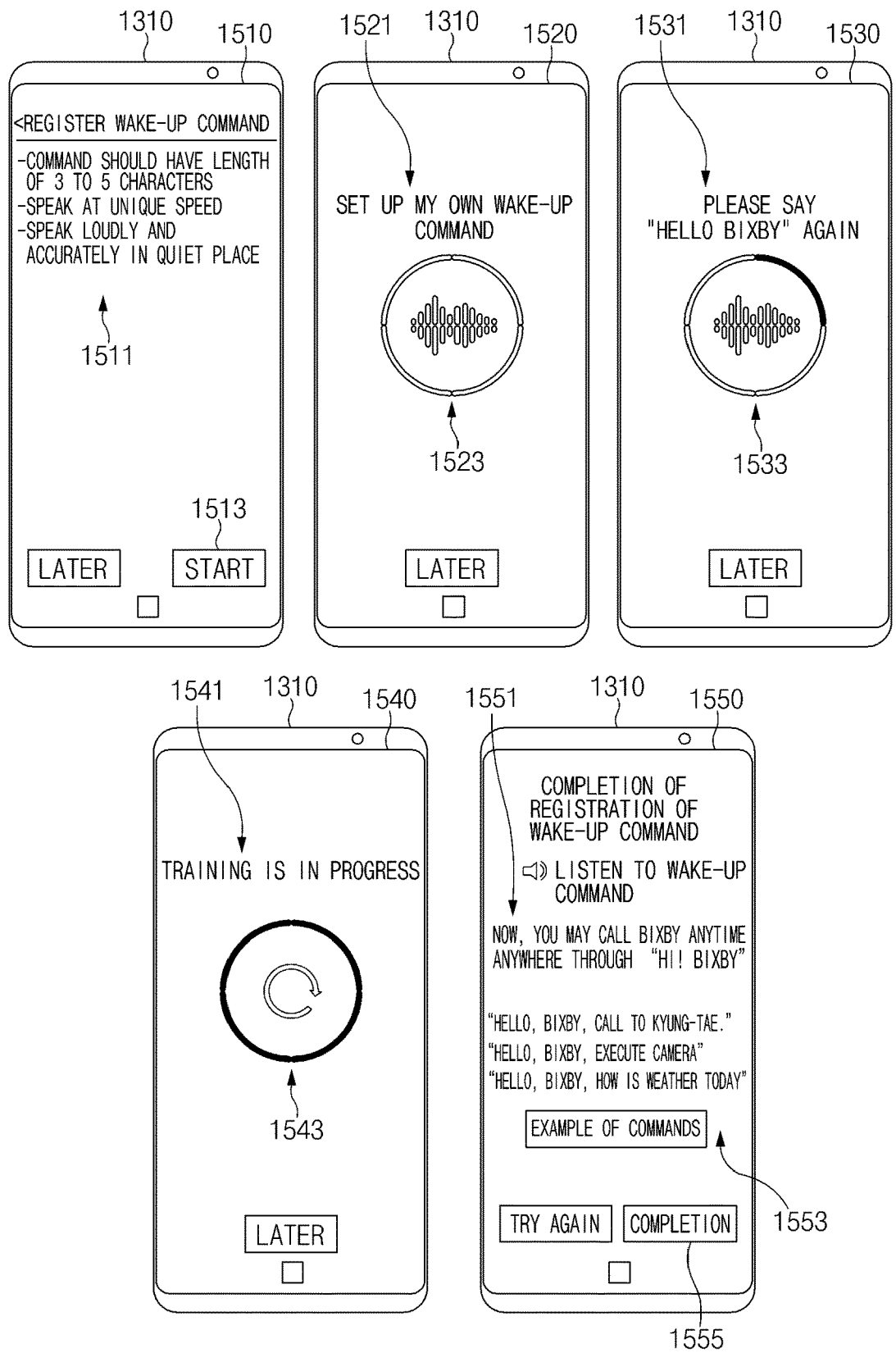
FIG. 6 is a diagram illustrating a screen, in which a user terminal registers a wake-up word, according to an embodiment.

FIG. 6 is a diagram illustrating a screen, in which a user terminal registers a wake-up word, according to an embodiment.

Referring to FIG. 6, the user terminal 1310 may output a user interface (UI) for registering a wake-up word through a display (e.g., the display 140 of FIG. 1).

According to an embodiment, on screen 1510, the user terminal 1310 may output a UI for starting registration of the wake-up word. The user terminal 1310 may display, on the UI, guide information 1511 of a user utterance for registering the wake-up word. According to an embodiment, the user terminal 1310 may receive a user input to start the registration of the wake-up word through an object 1513 (e.g., a virtual button).

According to an embodiment, on screen 1520, the user terminal 1310 may output a UI for receiving a first voice input to register the wake-up word, in a step of performing operation 1410 of FIG. 5. The user terminal 1310 may display, on the UI, first guide information 1521 for receiving the first voice input and an indicator 1523 for displaying a step of registering the wake-up word. The indicator 1523 may indicate the step of receiving the first voice input. According to an embodiment, the user terminal 1310 may receive the first voice input. For example, the user terminal

1310 may receive "Hello, Bixby!". According to an embodiment, the user terminal 1310 may determine whether the first voice input includes a specified word, through an intelligence server (e.g., the intelligence server 1320 of FIG. 4).

According to an embodiment, on screen 1530, the user terminal 1310 may output a UI for receiving a second voice input including the same word as the first voice input, in a step of performing operation 1450 of FIG. 5. The user terminal 1310 may display, on the UI, second guide information 1531 for receiving the second voice input, and an indicator 1533 indicating a step of receiving the second voice input. For example, the second guide information 1531 may include text data (e.g., Hello, Bixby) corresponding to the first voice input. According to an embodiment, the user terminal 1310 may receive the second voice input. For example, the user terminal 1310 may receive "Hello, Bixby!" again.

According to an embodiment, on screen 1540, the user terminal 1310 may output a UI indicating a process of performing wake-up word recognition training, in a step of performing operation 1460 of FIG. 5. The user terminal 1310 may display, on the UI, third guide information 1541 indicating that training is in progress, and an indicator 1543 indicating a training step. According to an embodiment, the user terminal 1310 may register a wake-up word based on the first voice input and the second voice input. For example, the user terminal 1310 may generate a wake-up word recognition model based on the first voice input and the second voice input. The user terminal 1310 may store the generated wake-up word recognition model in a memory (e.g., the memory 1311 of FIG. 4).

According to an embodiment, on screen 1550, the user terminal 1310 may output a UI indicating a result of registering the wake-up word. The user terminal 1310 may display, on the UI, third guide information 1551 including a result of registering a wake-up word, and an example 1553 of a voice input to perform a specified function. According to an embodiment, the user terminal 1310 may receive a user input to complete registration of the wake-up word, through an object 1555 (e.g., a virtual button).

Accordingly, when the user terminal 1310 recognizes the registered wake-up word, the state of the user terminal 1310 may be changed from a standby state to an active state.

Figure 7:
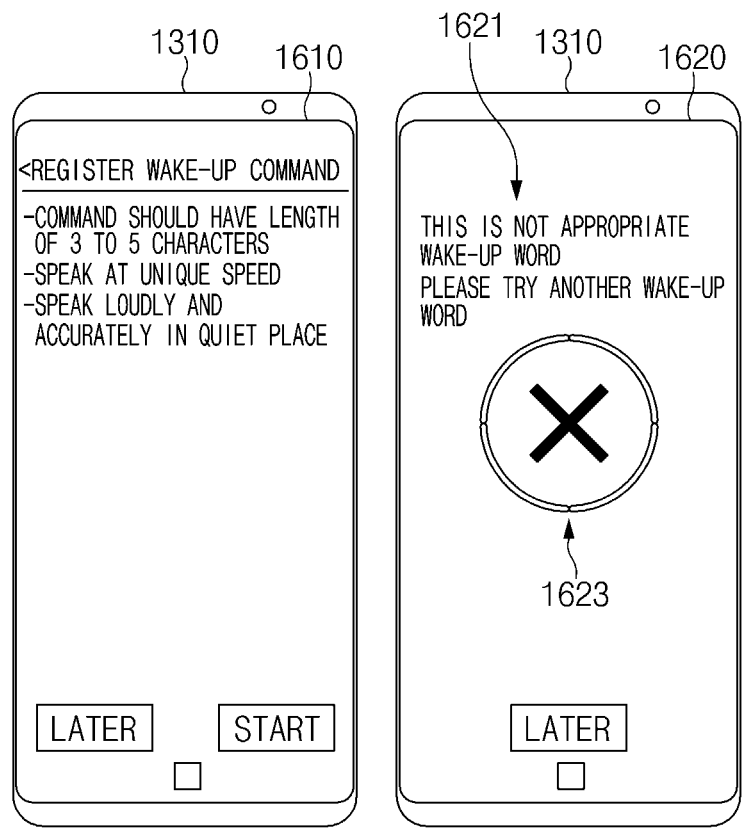
FIG. 7 is a view illustrating a screen in a case where a user terminal receives a voice input including an inappropriate word, according to an embodiment.

FIG. 7 is a view illustrating a screen in a case where a user terminal receives a voice input including an inappropriate word, according to an embodiment.

Referring to FIG. 7, when a voice input to register a wake-up word includes an inappropriate word (or a word that is prohibited to be registered as a wake-up word), the user terminal 1310 may output a UI for guiding a re-utterance on a display (e.g., the display 140 of FIG. 1).

According to an embodiment, on screen 1610, the user terminal 1310 may output a UI for starting registration of a wake-up word, similarly to screen 1510 of FIG. 6. According to an embodiment, the user terminal 1310 may receive a first voice input including a specified word. For example, the specified word may be an inappropriate word. According to an embodiment, the user terminal 1310 may determine whether a specified word is included in the first voice input, through an intelligence server (e.g., the intelligence server 1320 of FIG. 4).

According to an embodiment, on screen 1620, the user terminal 1310 may output a UI indicating a result of receiving a voice input including an inappropriate wake-up word, similarly to operation 1443 of FIG. 5. The user terminal 1310 may display, on the UI, guide information 1621 for receiving a different voice input, and an indicator 1623 indicating a state of an unregistered result.

Accordingly, the user terminal 1310 may prevent an inappropriate word from being registered as a wake-up word, and may again receive a voice input to register the wake-up word.

Figure 8:
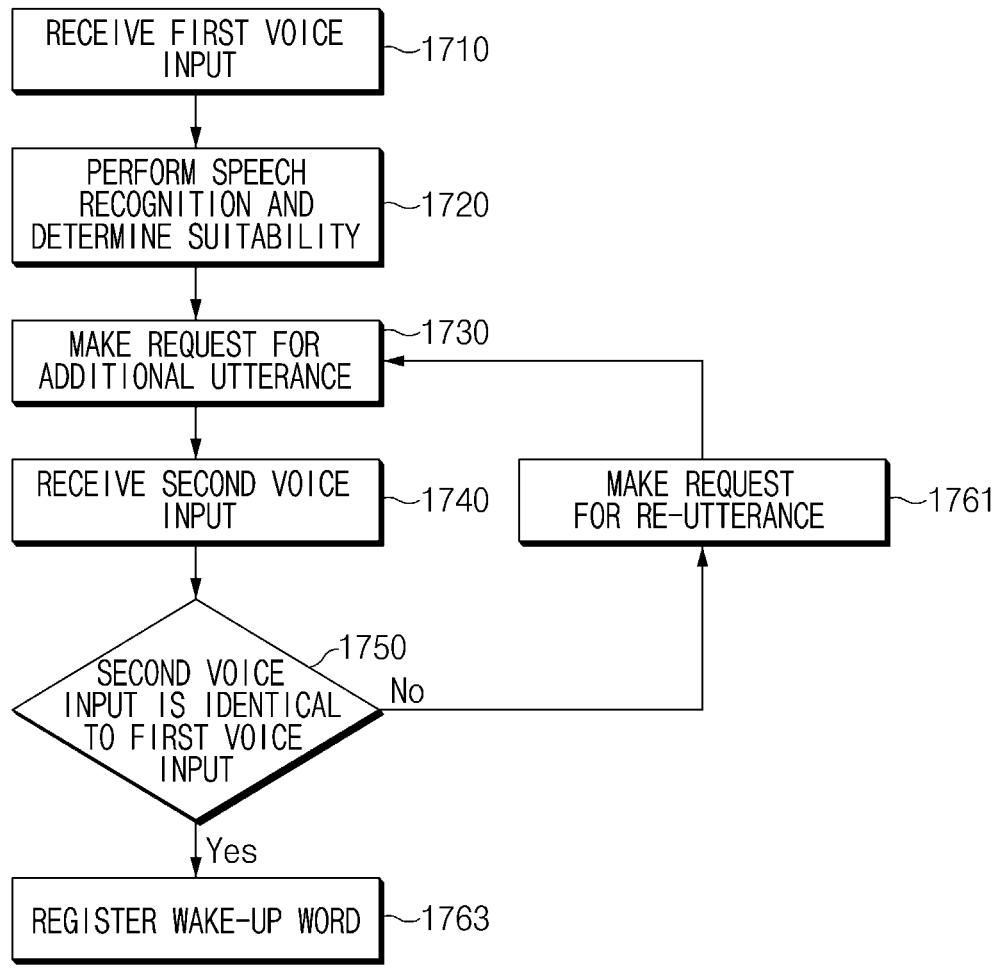
FIG. 8 is a flowchart illustrating a method, in which a user terminal trains a wake-up word, according to an embodiment.

FIG. 8 is a flowchart 1700 illustrating a method, in which a user terminal trains a wake-up word, according to an embodiment.

Referring to FIG. 8, a user terminal (e.g., the user terminal 1310 of FIG. 4) may determine whether a second voice input the same as a first voice input is received, and may perform training for recognizing a wake-up word.

According to an embodiment, in operation 1710, the user terminal may receive a first voice input to register a wake-up word, similarly to operation 1410 of FIG. 5. According to an embodiment, the user terminal may transmit the first voice input to an intelligence server (e.g., the intelligence server 1320 of FIG. 4).

According to an embodiment, in operation 1720, similarly to operation 1420 and operation 1430 of FIG. 5, the intelligence server may recognize the first voice input and may determine whether the recognized first voice input is suitable to be registered as a wake-up word (or registration suitability). For example, the intelligence server may determine whether a specified word is included in the first voice input. According to an embodiment, the intelligence server may transmit the determination result to the user terminal. According to an embodiment, the user terminal may perform the following operation for registering a wake-up word based on the determination result.

According to an embodiment, when the first voice input is suitable to be registered as a wake-up word, in operation 1730, the user terminal may make a request for a re-utterance for performing wake-up word training, similarly to operation 1441 of FIG. 5. For example, when the first voice input does not include the specified word, the user terminal may make a request for the re-utterance.

According to an embodiment, in operation 1740, the user terminal may receive a second voice input, similarly to operation 1450 of FIG. 5.

According to an embodiment, in operation 1750, the user terminal may determine whether the received second voice input is identical to the first voice input. For example, the user terminal may determine whether the first voice input is identical to the second voice input, by measuring a similarity between the first voice input and the second voice input. In other words, when the determined similarity is within a specified range, the user terminal may determine that the first voice input is identical to the second voice input.

According to an embodiment, when the first voice input is different from the second voice input (No), in operation 1761, the user terminal may make a request for the re-utterance for receiving the same voice input as the first voice input. For example, the first voice input may be "Galaxy", and the second voice input may be "Note". The user terminal may output "please say 'Galaxy' again." through a speaker (e.g., the speaker 130 of FIG. 1) or a display (e.g., the display 140 of FIG. 1).

According to an embodiment, when the first voice input is identical to the second voice input (Yes), in operation 1763, the user terminal may register a wake-up word based on the first voice input and the second voice input. For example, the user terminal may generate a wake-up word recognition model based on a first voice input and a second voice input and may store the generated model in a memory.

For example, the first voice input may be "Galaxy", and the second voice input may also be "Galaxy".

Accordingly, the user terminal may register a wake-up word by receiving a correct voice input to perform wake-up word training.

Figure 9:
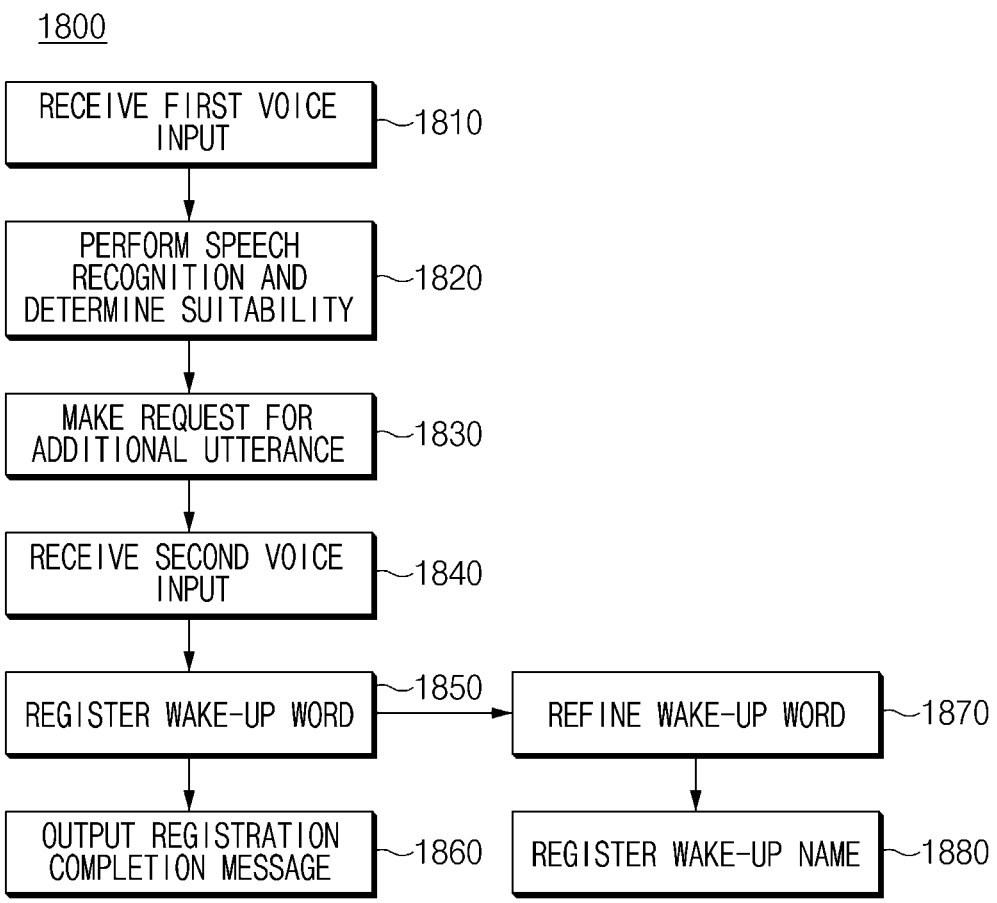
FIG. 9 is a flowchart illustrating a method of registering a wake-up name of a user terminal according to an embodiment.

FIG. 9 is a flowchart 1800 illustrating a method of registering a wake-up name of a user terminal according to an embodiment.

Referring to FIG. 9, a user terminal (e.g., the user terminal 1310 of FIG. 4) may generate a wake-up name of a user terminal by refining a registered wake-up word.

According to an embodiment, in operation 1810, the user terminal may receive a first voice input to register a wake-up word, similarly to operation 1710 of FIG. 8. According to an embodiment, the user terminal may transmit the first voice input to an intelligence server (e.g., the intelligence server 1320 of FIG. 4).

According to an embodiment, in operation 1820, similarly to operation 1720 of FIG. 8, the user terminal may recognize the first voice input and may determine whether the recognized first voice input is suitable to be registered as a wake-up word. For example, the intelligence server may determine whether a specified word is included in the first voice input. According to an embodiment, the intelligence server may transmit the determination result to the user terminal. According to an embodiment, the user terminal may perform the following operation for registering a wake-up word based on the determination result.

According to an embodiment, in operation 1830, when the first voice input is suitable to be registered as a wake-up word, the user terminal may make a request for a re-utterance for performing wake-up word training, similarly to operation 1730 of FIG. 8. For example, when the first voice does not include the specified word, the user terminal may make a request for a re-utterance for performing wake-up word training. According to an embodiment, similarly to operation 1840 of FIG. 9, the user terminal may receive a second voice input.

According to an embodiment, in operation 1850, the user terminal may register a wake-up word based on the first voice input and the second voice input, similarly to operation 1770 of FIG. 8. For example, the user terminal may generate a wake-up word recognition model based on the first voice input and the second voice input and may store the generated model in a memory. According to an embodiment, in operation 1860, the user terminal may output a wake-up word registration completion message through a speaker (e.g., the speaker 130 of FIG. 1) or a display (e.g., the display 140 of FIG. 1).

According to an embodiment, in operation 1870, the intelligence server may determine a wake-up name of the user terminal by refining the registered wake-up word. For example, when the registered wake-up word is in a specified format, the intelligence server may determine that at least part of the registered wake-up word is the wake-up name of the user terminal. When the registered wake-up word is, for example, "Hi! Galaxy!", the registered wake-up word may correspond to the specified format of 'Hi!<NAME>', and thus the intelligence server may determine that 'Galaxy' is the wake-up name of the user terminal. When the registered wake-up word is, for another example, "Bixby! Are you there?", the registered wake-up word may correspond to the specified format of "<NAME>Are you there?", and thus the intelligence server may determine that 'Bixby' is the wake-up name of the user terminal. According to an embodiment, in operation 1880, the intelligence server may register the determined wake-up name. For example, the intelligence server may store the determined wake-up name in a wake-up name DB (e.g., the wake-up name DB 1329 of FIG. 4).

According to another embodiment, operation 1870 and operation 1880 may be performed by the user terminal. In other words, the user terminal may perform an operation of refining the registered wake-up word.

Accordingly, the user terminal may generate a response corresponding to the voice input by using the registered wake-up name. An operation of generating a response by using a wake-up name will be described in FIG. 12.

Figure 10:
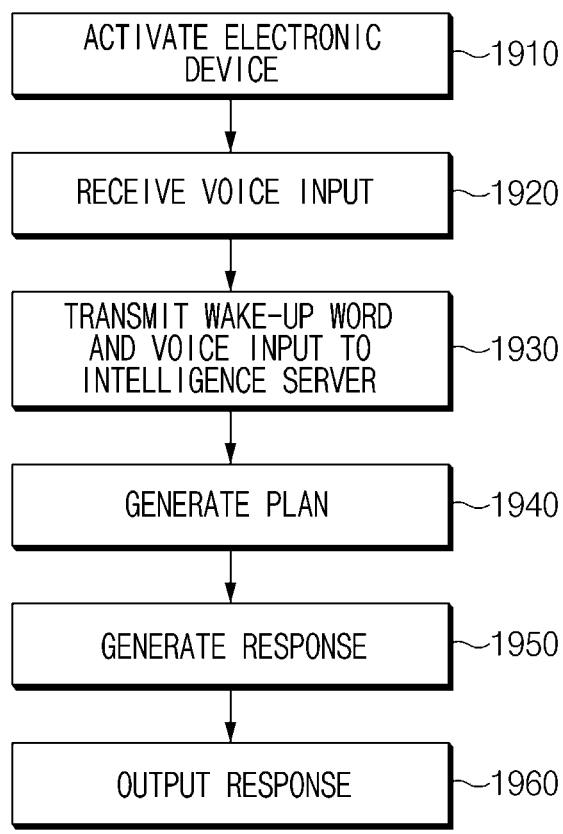
FIG. 10 is a flowchart illustrating a method of generating a response by using a wake-up name according to an embodiment.

FIG. 10 is a flowchart illustrating a method of generating a response by using a wake-up name according to an embodiment.

Referring to FIG. 10, a user terminal (e.g., the user terminal 1310 of FIG. 4) may process a voice input to perform a specified task, through an intelligence server (e.g., the intelligence server 1320 of FIG. 4).

According to an embodiment, in operation 1910, the user terminal may be changed to an active state by recognizing a registered wake-up word.

According to an embodiment, in operation 1920, the user terminal may receive a voice input to make a request for performing a specified task. For example, the user terminal may receive a voice input saying that "let me know today's Seoul weather!".

According to an embodiment, in operation 1930, the user terminal may transmit the received voice input to the intelligence server. In addition, the user terminal may transmit a wake-up word together with the voice input to the intelligence server.

According to an embodiment, in operation 1940, the user terminal may generate a plan corresponding to the voice input. For example, the user terminal may generate a plan corresponding to the voice input through an ASR module (e.g., the ASR module 1321 of FIG. 4), an NLU module (e.g., the NLU module 1323 of FIG. 4), and a planner module (e.g., the planner module 1325 of FIG. 4). For example, the intelligence server may determine an intent (e.g., intent=WEATHER_MESSAGE) for receiving weather information of the voice input and a parameter (e.g., param.weather.date=2018.02.28, param.weather.location=seoul) for obtaining the weather information, using the voice input. The intelligence server may generate a plan by stepwise arranging an action (e.g., WEATHERMESSAGE) of obtaining the weather information depending on the determined intent and a concept defining an input/output value for performing the action. The obtained parameter (e.g., 2018.02.28, seoul) may be positioned at the corresponding concept.

According to an embodiment, in operation 1950, the intelligence server may generate a response corresponding to a voice input. According to an embodiment, the intelligence server may obtain a result of performing the generated plan. For example, the intelligence server may obtain a "page of today's weather information". According to an embodiment, the intelligence server may generate guide information by using a wake-up name of the registered user terminal. For example, the user terminal may generate the guide information saying that "Galaxy will let you know about weather." According to an embodiment, the response may include not only the obtained result but also guide information using the wake-up name of the user terminal. According to an embodiment, the intelligence server may transmit the generated response to the user terminal.

According to an embodiment, in operation 1960, the user terminal may output the response. In other words, the user terminal may output a result obtained by performing a task and guide information using a wake-up name. For example, the user terminal may display a 'page for displaying today's weather information' on a display and may output guide information saying that "Galaxy will let you know about weather" through at least one of the display or a speaker.

Figure 11:
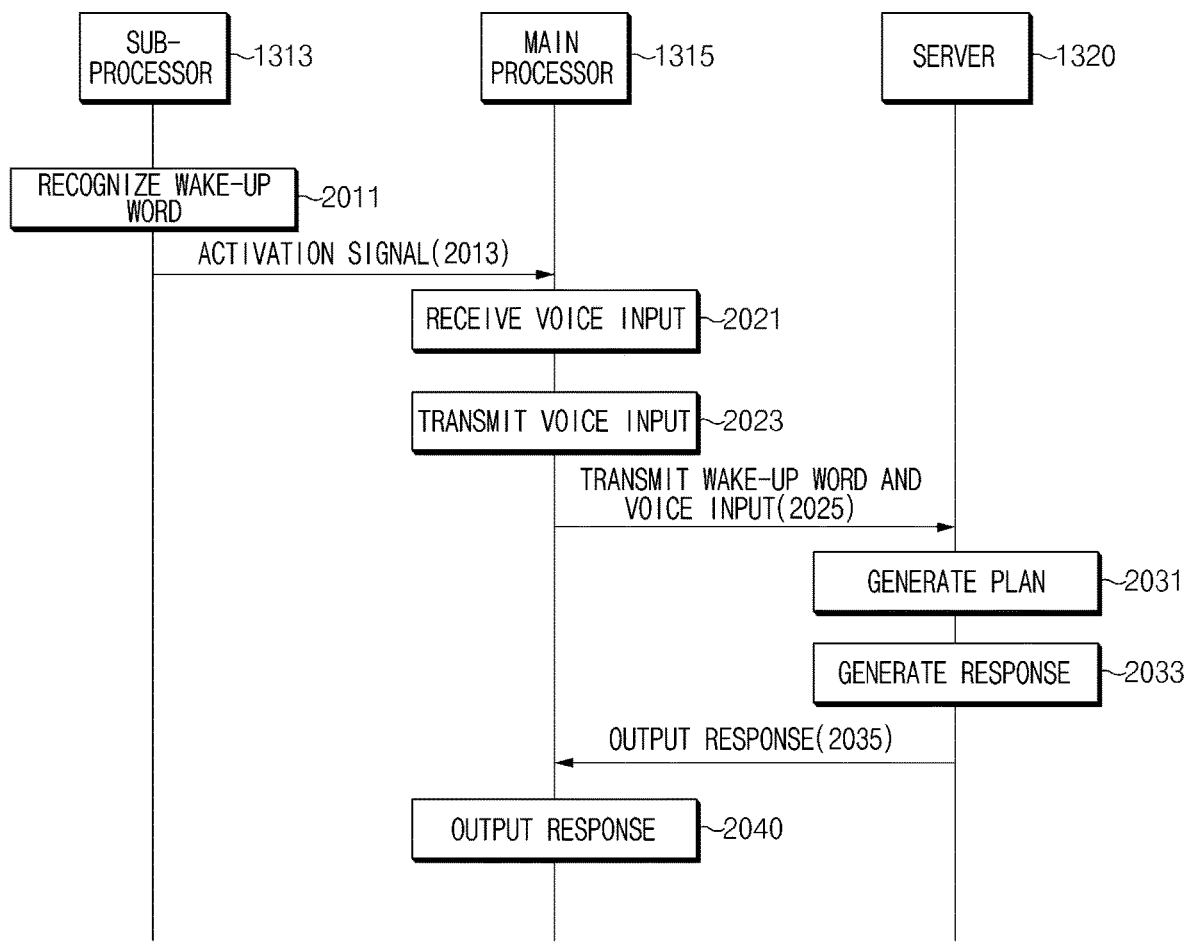
FIG. 11 is a sequence diagram illustrating a method, in which an intelligence server generates a response based on a recognized wake-up word, according to an embodiment.

FIG. 11 is a sequence diagram 2000 illustrating a method, in which an intelligence server generates a response based on a recognized wake-up word, according to an embodiment.

According to an embodiment, in operation 2011, the sub-processor 1313 of a user terminal (e.g., the user terminal 1310 of FIG. 4) may recognize a registered wake-up word (e.g., Galaxy). According to an embodiment, in operation 2013, the sub-processor 1313 may deliver an activation signal to the main processor 1315 of the user terminal. Accordingly, the user terminal may be activated.

According to an embodiment, in operation 2021, the main processor 1315 may receive a voice input through a microphone (e.g., the microphone 120 in FIG. 1). For example, the voice input may include a request for performing a specified task. According to an embodiment, in operation 2023, the main processor 1315 may transmit the received voice input to the intelligence server 1320. According to an embodiment, in operation 2025, the main processor 1315 may transmit a wake-up word to the intelligence server 1320 together with the voice input.

According to an embodiment, in operation 2031, the intelligence server 1320 may generate a plan corresponding to the voice input. According to an embodiment, in operation 2033, the intelligence server 1320 may generate a response corresponding to the voice input. The intelligence server 1320 may obtain a result of performing an action depending on the generated plan. Also, the intelligence server 1320 may generate a guide message by using a wake-up name corresponding to the received wake-up word. The wake-up name may be determined by refining the wake-up word. According to an embodiment, the response may include the generated guide information, as well as the obtained result. According to an embodiment, in operation 2035, the intelligence server 1320 may transmit the generated response to the user terminal.

According to an embodiment, in operation 2040, the main processor 1315 of the user terminal may output guide information using a wake-up name together with the result of performing the task, using the response.

Figure 12:
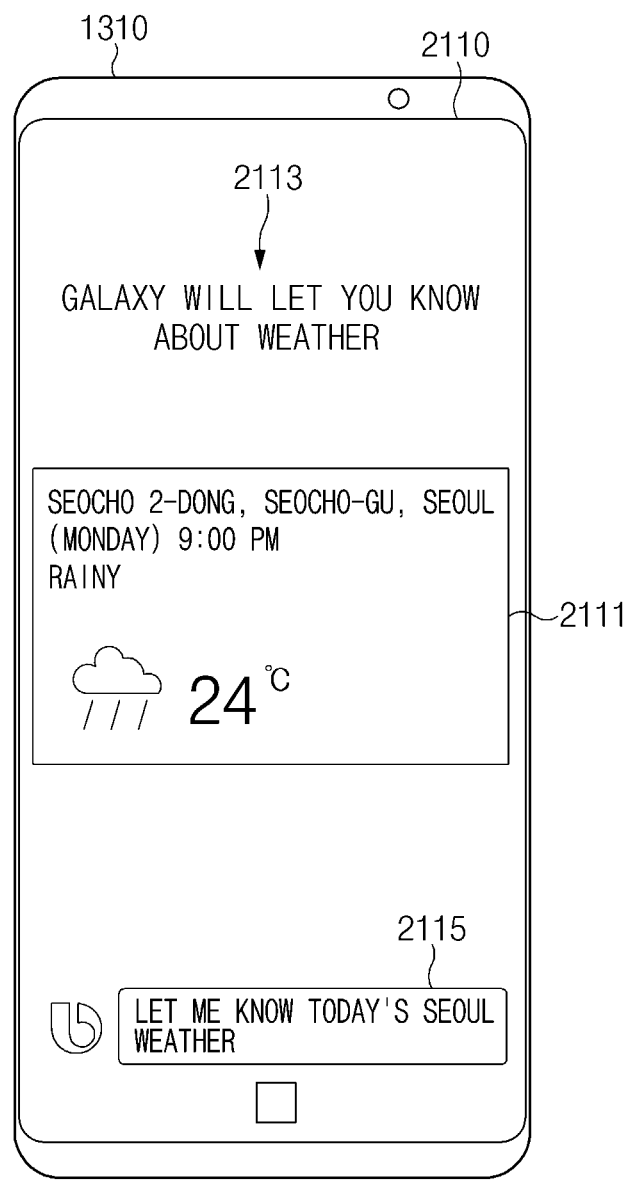
FIG. 12 is a diagram illustrating a screen, on which a user terminal provides a response based on a wake-up word, according to an embodiment.

FIG. 12 is a diagram illustrating a screen, on which a user terminal provides a response based on a wake-up word, according to an embodiment.

According to an embodiment, on screen 2110, the user terminal 1310 may receive a response corresponding to a voice input from an intelligence server (e.g., the intelligence server 1320 of FIG. 4) and may display a result UI obtained by processing the voice input, using the response. The user terminal 1310 may display, on the UI, a result 2111 (e.g., a page of today's weather information) obtained by performing a task corresponding to the voice input. The user terminal 1310 may display guide information 2113 (e.g., "Galaxy will let you know about weather") by using a wake-up name (e.g., Galaxy) on the UI. Besides, the user terminal 1310 may display text data 2115 (e.g., "let me know today's Seoul weather!") of the received voice input on the UI. The text data may be received from the intelligence server.

Figure 13:
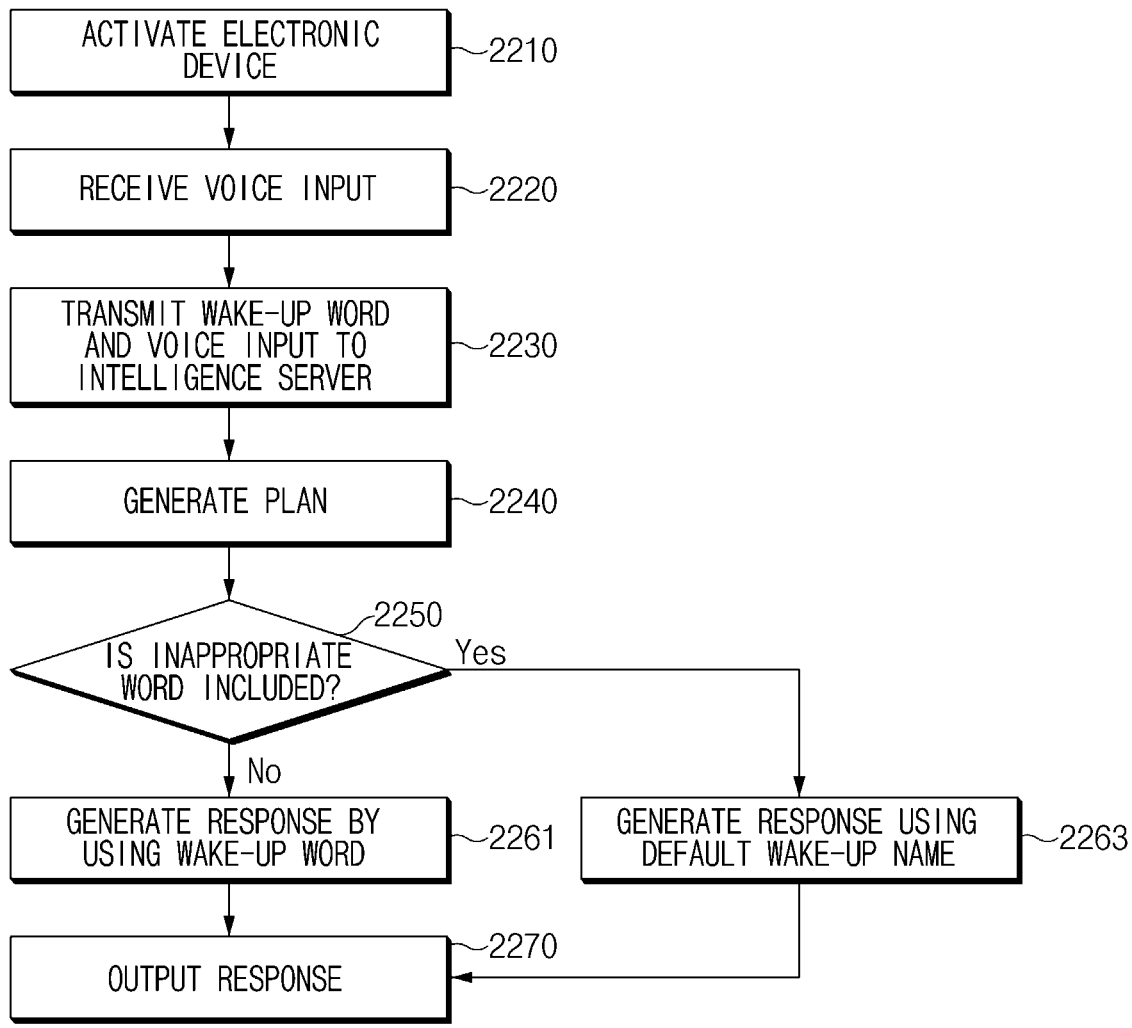
FIG. 13 is a flowchart illustrating a method, in which an intelligence server determines a wake-up name included in a response, according to an embodiment.

FIG. 13 is a flowchart 2200 illustrating a method, in which an intelligence server determines a wake-up name included in a response, according to an embodiment.

Referring to FIG. 13, a user terminal (e.g., the user terminal 1310 of FIG. 4) may determine whether a wake-up word includes an inappropriate word (or a word that is prohibited to be registered as a wake-up word) (e.g., an idiot), through an intelligence server (e.g., the intelligence server 1320 of FIG. 4), may determine the wake-up word depending on the determination result, and may provide guide information.

According to an embodiment, in operation 2210, the user terminal may be changed to an active state by recognizing a registered wake-up word, similarly to operation 1910 in FIG. 10.

According to an embodiment, in operation 2220, the user terminal may receive a voice input to make a request for performing a specified task, similarly to operation 1920 of FIG. 10.

According to an embodiment, in operation 2230, the user terminal may transmit a wake-up word together with the received voice input to the intelligence server, similarly to operation 1930 in FIG. 10.

According to an embodiment, in operation 2240, the user terminal may generate a plan corresponding to the voice, similarly to operation 1940 in FIG. 10.

According to an embodiment, in operation 2250, the user terminal may determine whether a wake-up word is suitable to generate guide information. For example, the user terminal may determine whether the wake-up word includes a specified word. For example, the specified word may be inappropriate to be registered as a wake-up word.

According to an embodiment, when the wake-up word does not include the specified word (No), in operation 2261, the user terminal may generate a response including guide information using the wake-up word together with the result of performing a task. The user terminal may generate guide information saying that "Galaxy will let you know about today's weather.", using the wake-up word.

According to an embodiment, when the wake-up word includes the specified word (Yes), in operation 2263, the user terminal may generate a response including guide information using a name different from the wake-up word, together with a result of performing the task. For example, the name may be set by default (e.g., Bixby). The user terminal may generate guide information saying that "Bixby will let you know about today's weather" instead of an inappropriate wake-up word of an "idiot".

According to an embodiment, in operation 2270, the user terminal may output a response generated from the intelligence server. For example, the user terminal may output guide information using a wake-up name, and a result obtained by performing the task. For example, the user terminal may display a 'page for displaying today's weather information' on a display and may output guide information saying that "Galaxy will let you know about weather." or guide information "Bixby will let you know about weather.", through at least one of the display or a speaker.

Accordingly, the user terminal may be prevented from providing a response corresponding to a voice input by using an inappropriate word.

According to various embodiments of the disclosure described with reference to FIGS. 4 to 13, when receiving a voice input to register a wakeup word to activate a main processor, the user terminal 1310 may determine whether the received voice input includes an inappropriate word, thereby preventing the inappropriate word from being registered as the wakeup word.

Figure 14:
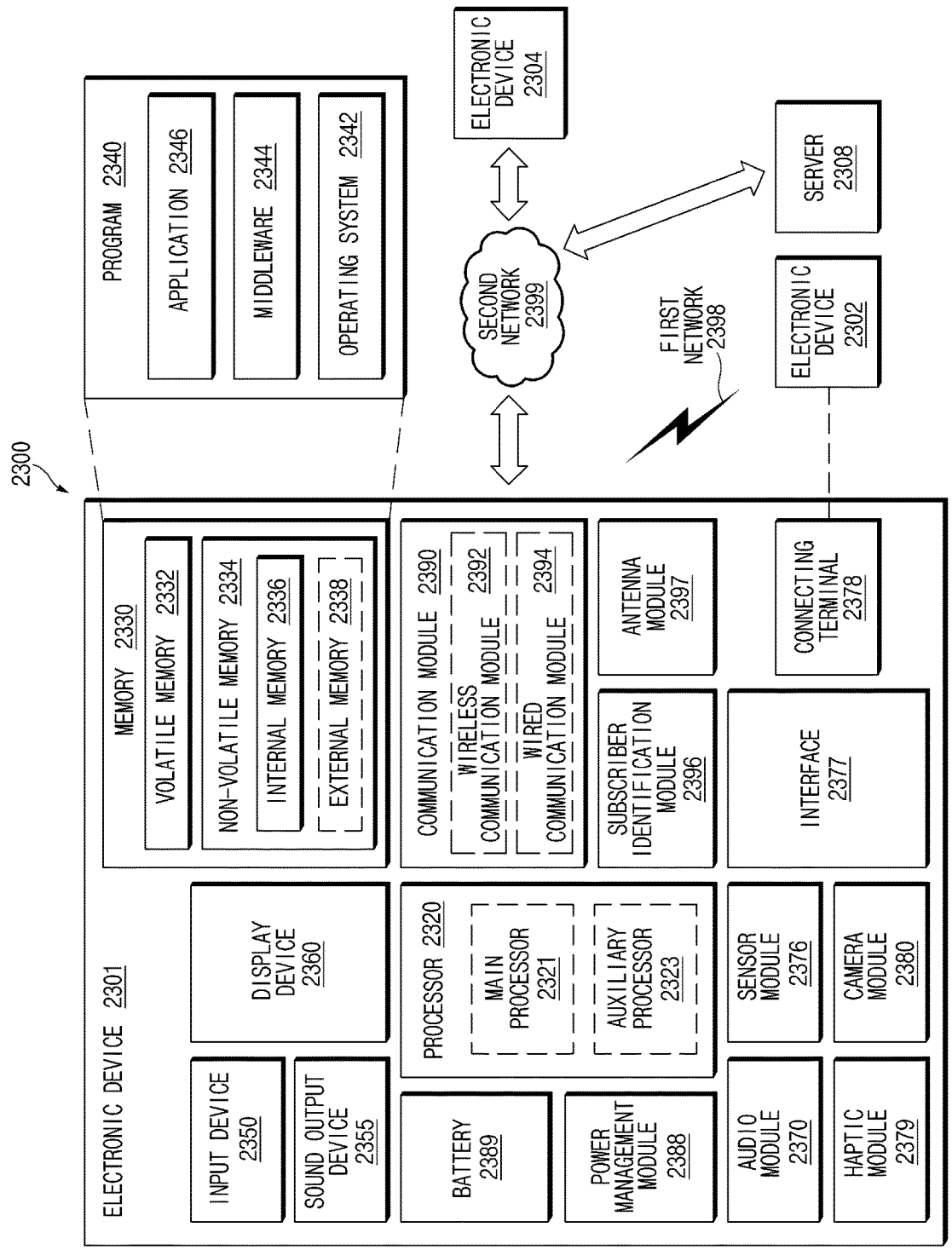
FIG. 14 is a block diagram of an electronic device in a network environment, according to various embodiments.

FIG. 14 illustrates a block diagram of an electronic device 1401 in a network environment 1400, according to various embodiments.

Referring to FIG. 14, the electronic device 2301 in the network environment 2300 may communicate with an electronic device 2302 over a first network 2398 (e.g., a short range wireless communication network) or may communicate with an electronic device 2304 or a server 2308 over a second network 2399 (e.g., a long distance wireless communication network). According to an embodiment, the electronic device 2301 may communicate with the electronic device 2304 through the server 2308. According to an embodiment, the electronic device 2301 may include a processor 2320, a memory 2330, an input device 2350, a sound output device 2355, a display device 2360, an audio module 2370, a sensor module 2376, an interface 2377, a haptic module 2379, a camera module 2380, a power management module 2388, a battery 2389, a communication module 2390, a subscriber identification module 2396, or an antenna module 2397. In any embodiment, at least one (e.g., the display device 2360 or the camera module 2380) of the components may be omitted from the electronic device 2301, or one or more other components may be further included in the electronic device 2301. In any embodiment, some of the components may be implemented with a single integrated circuit. For example, the sensor module 2376 (e.g., a fingerprint sensor, an iris sensor, or an illumination sensor) may be embedded in the display device 2360 (e.g., a display).

The processor 2320 may execute, for example, software (e.g., a program 2340) to control at least one other component (e.g., a hardware or software component) of the electronic device 2301 connected to the processor 2320, and may perform various data processing or operations. According to an embodiment, as at least a part of the data processing or operations, the processor 2320 may load a command or data received from any other component (e.g., the sensor module 2376 or the communication module 2390) to a volatile memory 2332, may process the command or data stored in the volatile memory 2332, and may store processed data in a nonvolatile memory 2334. According to an embodiment, the processor 2320 may include a main processor 2321 (e.g., a central processing unit or an application processor) and an auxiliary processor 2323 (e.g., a graphic processing device, an image signal processor, a sensor hub processor, or a communication processor), which may be operated independently of or together with the main processor 2321. Additionally or alternatively, the auxiliary processor 2323 may be configured to use lower power than the main processor 2321 or to be specialized for a specified function. The auxiliary processor 2323 may be implemented separately from the main processor 2321 or may be implemented as a part of the main processor 2321.

The auxiliary processor 2323 may control at least a part of a function or states associated with at least one component (e.g., the display device 2360, the sensor module 2376, or the communication module 2390) of the electronic device 2301, for example, instead of the main processor 2321 while the main processor 2321 is in an inactive (e.g., sleep) state and together with the main processor 2321 while the main processor 2321 is in an active (e.g., an application execution) state. According to an embodiment, the auxiliary processor 2323 (e.g., an image signal processor or a communication processor) may be implemented as a part of any other component (e.g., the camera module 2380 or the communication module 2390) which is functionally (or operatively) associated with the auxiliary processor 2323.

The memory 2330 may store various data which are used by at least one component (e.g., the processor 2320 or the sensor module 2376) of the electronic device 2301. The data may include, for example, software (e.g., the program 2340), or input data or output data associated with a command of the software. The memory 2330 may include the volatile memory 2332 or the nonvolatile memory 2334.

The program 2340 may be stored in the memory 2330 as software, and may include, for example, an operating system 2342, a middleware 2344, or an application 2346.

The input device 2350 may receive a commands or data which will be used by a component (e.g., the processor 2320) of the electronic device 2301, from the outside (e.g., a user) of the electronic device 2301. The input device 2350 may include, for example, a microphone, a mouse, or a keyboard.

The sound output device 2355 may output a sound signal to the outside of the electronic device 2301. The sound output device 2355 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2360 may visually provide information to the outside (e.g., the user) of the electronic device 2301. The display device 2360 may include, for example, a display, a hologram device, or a control circuit for controlling a projector and a corresponding device. According to an embodiment, the display device 2360 may include a touch circuitry configured to sense a touch, or a sensor circuitry (e.g., a pressure sensor) configured to measure the strength of force generated by the touch.

The audio module 2370 may convert sound to an electrical signal, or reversely, may convert an electrical signal to sound. According to an embodiment, the audio module 2370 may obtain sound through the input device 2350, or may output sound through the sound output device 2355, or through an external electronic device (e.g., the electronic device 2302) (e.g., a speaker or a headphone) directly or wirelessly connected with the electronic device 2301.

The sensor module 2376 may sense an operation state (e.g., power or a temperature) of the electronic device 2301 or an external environment state (e.g., a user state), and may generate an electrical signal or a data value corresponding the sensed state. According to an embodiment, the sensor module 2376 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2377 may support one or more specified protocols that may be used to directly and wirelessly connect the electronic device 2301 with an external electronic device (e.g., the electronic device 2302). According to an embodiment, the interface 2377 may include, for example, a high definition multimedia interface (HDMI), a universal serial bus (USB) interface, a secure digital (SD) card interface, or an audio interface.

A connection terminal 2378 may include a connector that may allow the electronic device 2301 to be physically connected with an external electronic device (e.g., the electronic device 2302). According to an embodiment, the connection terminal 2378 may include, for example, a HDMI connector, a USB connector, a SD card connector, or an audio connector (e.g., a headphone connector).

The haptic module 2379 may convert an electrical signal to a mechanical stimulation (e.g., vibration or movement) or an electrical stimulation which the user may perceive through the sense of touch or the sense of movement. According to an embodiment, the haptic module 2379 may include, for example, a motor, a piezoelectric sensor, or an electrical stimulation device.

The camera module 2380 may photograph a still image and a video. According to an embodiment, the camera module 2380 may include one or more lenses, image sensors, image signal processors, or flashes (or electrical flashes).

The power management module 2388 may manage the power which is supplied to the electronic device 2301. According to an embodiment, the power management module 2388 may be implemented, for example, as at least a part of a power management integrated circuit (PMIC).

The battery 2389 may power at least one component of the electronic device 2301. According to an embodiment, the battery 2389 may include, for example, a primary cell not recharged, a secondary cell rechargeable, or a fuel cell.

The communication module 2390 may establish a direct (or wired) communication channel or a wireless communication channel between the electronic device 2301 and an external electronic device (e.g., the electronic device 2302, the electronic device 2304, or the server 2308) or may perform communication through the established communication channel. The communication module 2390 may include one or more communication processors which is operated independently of the processor 2320 (e.g., an application processor) and supports direct (or wired) communication or wireless communication. According to an embodiment, the communication module 2390 may include a wireless communication module 2392 (e.g., a cellular communication module, a short range wireless communication module, or a global navigation satellite system (GNSS) communication module) or a wired communication module 2394 (e.g., a local area network (LAN) communication module or a power line communication module). A corresponding communication module of such communication modules may communicate with an external electronic device over the first network 2398 (e.g., a short range communication network such as Bluetooth, Wi-Fi direct, or infrared data association (IrDA)) or the second network 2399 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 2392 may verify and authenticate the electronic device 2301 within a communication network, such as the first network 2398 or the second network 2399, by using subscriber information (e.g., international mobile subscriber identity (IMSI)) stored in the subscriber identification module 2396.

The antenna module 2397 may transmit a signal or a power to the outside (e.g., an external electronic device) or may receive a signal or a power from the outside. According to an embodiment, the antenna module 2397 may include one or more antennas, and at least one antenna which is suitable for a communication scheme used in a computer network such as the first network 2398 or the second network 2399 may be selected, for example, by the communication module 2390 from the one or more antennas.

The signal or power may be exchanged between the communication module 2390 and an external electronic device through the selected at least one antenna or may be received from the external electronic device through the selected at least one antenna and the communication module 2390.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2301 and the external electronic device 2304 through the server 2308 connecting to the second network 2399. Each of the electronic devices 2302 and 2304 may be a device, the kind of which is the same as or different from a kind of the electronic device 2301. According to an embodiment, all or a part of operations to be executed in the electronic device 2301 may be executed in one or more external devices of the external electronic devices 2302, 2304, or 2308. For example, in the case where the electronic device 2301 should perform any function or service automatically or in response to a request from the user or any other device, the electronic device 2301 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2301. The electronic device 2301 may process received result as it is or additionally, and may provide a result of the processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 2340) including an instruction stored in a machine-readable storage medium (e.g., an internal memory 2336 or an external memory 2338) readable by a machine (e.g., the electronic device 2301). For example, the processor (e.g., the processor 2320) of a machine (e.g., the electronic device 2301) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The invention claimed is:

1. An electronic device comprising:
a communication interface;
memory;
a microphone;
a speaker;
a display;
a main processor; and
a sub-processor configured to activate the main processor by recognizing a wake-up word included in a voice input,
wherein the memory stores instructions that, when executed, cause the main processor to:
  receive from a user a first voice input to register the wake-up word through the microphone;
  determine whether the first voice input includes a specified word, wherein to determine whether the first voice input includes the specified word, the instructions cause the main processor to:
  transmit the first voice input to an external server through the communication interface; and
  receive a determination result of determining whether the first voice input includes the specified word, from the external server through the communication interface;
  when the determination result indicates that the first voice input does not include the specified word:
    display a first user interface (UI) guiding the user to speak a word identical to the first voice input, through the display, wherein the first UI requests to receive a second voice input including the word identical to the first voice input;
    receive the second voice input from the user, through the microphone;
    when receiving the second voice input, determine whether the second voice input is identical to the first voice input;
    when the first voice input is different from the second voice input, output a second UI for receiving a third voice input identical to the first voice input, through the display;
    when the first voice input is identical to the second voice input, generate a wake-up word recognition model for recognizing the wake-up word based on the first voice input and the second voice input; and
    store the generated wake-up word recognition model in the memory based on the first voice input and the second voice input; and
  when the determination result indicates that the first voice input includes the specified word, output a third UI for requesting a fourth voice input different from the first voice input, through the display, wherein the third UI does not include the word identical to the first voice input,
wherein the sub-processor is configured to activate the main processor by recognizing the registered wake-up word,
wherein the sub-processor consumes power less than the main processor, and
wherein when the main processor is activated, the instructions cause the activated main processor to:
  receive a fifth voice input to perform a specified task and the wake-up word, through the microphone;
  transmit the fifth voice input and the received wake-up word to the external server through the communication interface;

determine whether the received wake-up word includes the specified word by receiving a determination result of determining whether the transmitted wake-up word includes the specified word, from the external server through the communication interface;

when the determination result indicates that the transmitted wake-up word does not include the specified word:

receive a first response corresponding to the fifth voice input from the external server through the communication interface, wherein the first response includes action information for performing the specified task and a wake-up name of the electronic device included in the wake-up word; and output the first response, through the speaker or the display; and when the determination result indicates that the transmitted wake-up word includes the specified word:

receive a second response corresponding to the fifth voice input from the external server through the communication interface, wherein the second response includes the action information for performing the specified task and a name different from the wake-up word; and output the second response, through the speaker or the display.

2. The electronic device of claim 1, wherein the instructions cause the main processor to:

receive the fourth voice input through the microphone;

determine whether the fourth voice input includes the specified word; and when the fourth voice input does not include the specified word, receive a sixth voice input including a word identical to the fourth voice input, through the microphone, generate the wake-up word recognition model for recognizing the wake-up word, based on the fourth voice input and the sixth voice input, and store the generated wake-up word recognition model in the memory.

3. The electronic device of claim 1, wherein the specified word is a word prohibited to be registered as the wake-up word.

4. The electronic device of claim 1, wherein the wake-up word recognition model is a speech recognition model generated by using model training based on at least one of a hidden Markov model (HMM) algorithm or a neural network algorithm, or an adaptive training algorithm.

5. The electronic device of claim 1, wherein the instructions cause the main processor to:

measure a similarity between the first voice input and the second voice input; and when the measured similarity is not less than a specified value, determine that the first voice input is identical to the second voice input.

6. The electronic device of claim 5, wherein the instructions cause the main processor to:

measure the similarity by using at least one of a feature vector, a forward-backward probability, and a phoneme level of the first voice input and the second voice input.

7. The electronic device of claim 1, wherein the instructions cause the sub-processor to:

when recognizing the wake-up word by using the wake-up word recognition model, activate the main processor;

wherein the instructions cause the activated main processor to:

receive a sixth voice input to perform a specified task, through the microphone;

transmit the received sixth voice input to an external server through the communication interface;

receive a response corresponding to the sixth voice input from the external server through the communication interface, wherein the response includes action information corresponding to the sixth voice input; and perform an action for performing the task based on the action information.

8. The electronic device of claim 7, wherein the instructions cause the main processor to:

when the wake-up word is in a specified format, register at least part of the wake-up word as the wake-up name of the electronic device;

receive the response including the wake-up name together with the action information; and provide information about the response by using the wake-up name.

9. The electronic device of claim 1, wherein the memory comprises a first memory storing the instructions and a second memory physically separated from the first memory, and wherein the instructions cause the processor to:

when registering the generated wake-up word recognition model in the memory, register the generated wake-up word recognition model in the second memory.

10. The electronic device of claim 1, wherein the name different from the wake-up word includes a default wake-up name of the electronic device.

11. A method for processing a voice input, the method comprising:

receiving from a user a first voice input to register a wake-up word;

determining whether the first voice input includes a specified word, by:

transmitting the first voice input to an external server; and receiving a determination result of determining whether the first voice input includes the specified word, from the external server;

when the determination result indicates that the first voice input does not include the specified word:

outputting a first user interface (UI) guiding the user to speak a word identical to the first voice input, the first UI for receiving a second voice input including a word identical to the first voice input;

receiving the second voice input from the user;

when receiving the second voice input, determining whether the second voice input is identical to the first voice input;

when the first voice input is different from the second voice input, outputting a second UI for receiving a third voice input identical to the first voice input, through a display;

when the first voice input is identical to the second voice input, generating a wake-up word recognition model for recognizing the wake-up word based on the first voice input and the second voice input;

storing the generated wake-up word recognition model in memory based on the first voice input and the second voice input;

when the determination result indicates that the first voice input includes the specified word, outputting a third UI for requesting a fourth voice input different from the first voice input, through the display, wherein the third UI does not include the word identical to the first voice input;

activating, by a sub-processor, a main processor of an electronic device by recognizing the registered wake-up word, wherein the sub-processor consumes power less than the main processor; and when the main processor is activated, operating the activated main processor by:
- receiving a fifth voice input to perform a specified task and the wake-up word, through a microphone;
- transmitting the fifth voice input and the received wake-up word to the external server through a communication interface;
- determining whether the received wake-up word includes the specified word by receiving a determination result of determining whether the transmitted wake-up word includes the specified word, from the external server through the communication interface;
- when the determination result indicates that the transmitted wake-up word does not include the specified word:
  - receiving a first response corresponding to the fifth voice input from the external server through the communication interface, wherein the first response includes action information for performing the specified task and a wake-up name of the electronic device included in the wake-up word; and
  - outputting the first response, through a speaker or the display; and
- when the determination result indicates that the transmitted wake-up word includes the specified word:
  - receiving a second response corresponding to the fifth voice input from the external server through the communication interface, wherein the second response includes the action information for performing the specified task and a name different from the wake-up word; and
  - outputting the second response, through the speaker or the display.

12. The method of claim 11, wherein the name different from the wake-up word includes a default wake-up name of the electronic device.

* * * * *